US006425601B1

(12) United States Patent
Lewis

(10) Patent No.: US 6,425,601 B1
(45) Date of Patent: *Jul. 30, 2002

(54) AIR BAG MODULE

(75) Inventor: Donald J. Lewis, Scottsdale, AZ (US)

(73) Assignee: Universal Propulsion Company, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/590,037

(22) Filed: Jun. 8, 2000

Related U.S. Application Data

(63) Continuation-in-part of application No. 08/999,923, filed on Sep. 9, 1997, now Pat. No. 6,142,508, which is a continuation of application No. 08/664,973, filed on Jun. 3, 1996, now abandoned.

(51) Int. Cl.[7] .......................... B60R 21/20; B60R 21/26; B60R 21/32
(52) U.S. Cl. .................... 280/728.2; 280/735; 280/737; 280/741; 280/743.1; 102/531
(58) Field of Search ................................. 280/737, 736, 280/741, 730.1, 730.2, 728.2, 743.1, 728.1, 735

(56) References Cited

U.S. PATENT DOCUMENTS

| 3,756,621 A | 9/1973 | Lewis et al. ................. 280/741 |
| 3,767,228 A | 10/1973 | Lewis |
| 3,807,754 A | 4/1974 | Rodenbach et al. ...... 280/743.1 |
| 3,836,168 A | 9/1974 | Nonaka et al. |
| 3,837,671 A | 9/1974 | Hamilton |
| 3,874,694 A | 4/1975 | Stephenson |
| 4,153,273 A | 5/1979 | Risko ........................ 280/740 |
| 5,149,130 A | 9/1992 | Wooley et al. ........... 280/743.1 |
| 5,161,821 A | 11/1992 | Curtis |
| 5,251,931 A | 10/1993 | Semchena et al. ....... 280/730.1 |
| 5,322,322 A | 6/1994 | Bark et al. |
| 5,335,598 A | 8/1994 | Lewis et al. ................. 102/218 |
| 5,335,940 A | 8/1994 | Cuevas ........................ 280/737 |
| 5,364,125 A | 11/1994 | Brown et al. ............ 280/730.2 |

(List continued on next page.)

Primary Examiner—Peter C. English
(74) Attorney, Agent, or Firm—Jerry J. Holden; John D. Titus

(57) ABSTRACT

The present invention is a self-contained air bag module and to a method of protecting an occupant of a vehicle in a collision involving the vehicle using the self-contained air bag module of the invention. The self-contained air bag module of the invention has an air bag having an interior volume in fluid communication with a high thermal efficiency inflator, the high thermal efficiency inflator having an initiator, and adapted for producing a sufficient quantity of a gaseous product to substantially inflate the air bag; and an impact detector in electrical or mechanical communication with the initiator. The high thermal efficiency inflator contains a pyrotechnic material in an amount sufficient to produce at least about 10 mole percent of the inflation gas, and a pressurized gas is present in an amount sufficient to produce up to about 90 mole percent of the inflation gas. The storage pressure of the gas is sufficiently high to produce an aerodynamic drag on burning pyrotechnic material passing through the gas, thereby slowing the burning pyrotechnic material, where the drag produced on the burning pyrotechnic material and the distance between the stored pyrotechnic material and the inner surface of the housing of the inflator are sufficiently great that, upon combustion of the pyrotechnic material, contact between a sufficient amount of the burning pyrotechnic material and the inner surface of the housing is prevented to allow at least about 90 percent of the heat produced by the combustion of the pyrotechnic material to be transferred to the inflation gas, so that no more than about 10 percent of the heat is transferred to the housing, resulting in a thermal efficiency of the high thermal efficiency inflator of at least about 90 percent.

39 Claims, 11 Drawing Sheets

U.S. PATENT DOCUMENTS

| | | | |
|---|---|---|---|
| 5,393,091 A | 2/1995 | Tanaka et al. | 280/733 |
| 5,440,991 A | 8/1995 | Lewis et al. | 102/218 |
| 5,454,586 A | 10/1995 | Rogerson | 280/728.2 |
| 5,464,246 A | 11/1995 | Castro et al. | 280/730.2 |
| 5,468,012 A | 11/1995 | Mihm | 280/728.2 |
| 5,472,230 A | 12/1995 | Every, Sr. et al. | 280/728.2 |
| 5,480,181 A | 1/1996 | Bark et al. | 280/730.2 |
| 5,496,061 A | 3/1996 | Brown | 280/730.2 |
| 5,499,579 A | 3/1996 | Lewis | 102/331 |
| 5,499,840 A | 3/1996 | Nakano | 280/730.1 |
| 5,507,230 A | 4/1996 | Lewis et al. | 102/218 |
| 5,533,750 A | 7/1996 | Karlow et al. | 280/730.2 |
| 5,556,127 A | 9/1996 | Hurford et al. | 280/730.2 |
| 5,564,739 A | 10/1996 | Davidson | 280/736 |
| 5,570,900 A | 11/1996 | Brown | 280/729 |
| 5,586,782 A | 12/1996 | Zimmerman, II et al. | 280/730.2 |
| 5,588,670 A | 12/1996 | Storey et al. | 280/730.2 |
| 5,607,180 A | 3/1997 | Kornhauser | 280/736 |
| 5,613,698 A | 3/1997 | Patercsak et al. | 280/728.1 |
| 5,695,242 A | 12/1997 | Brantman et al. | 297/216.1 |
| 5,804,758 A | 9/1998 | Marsaud et al. | 102/288 |
| 6,199,905 B1 * | 3/2001 | Lewis | 280/737 |

* cited by examiner

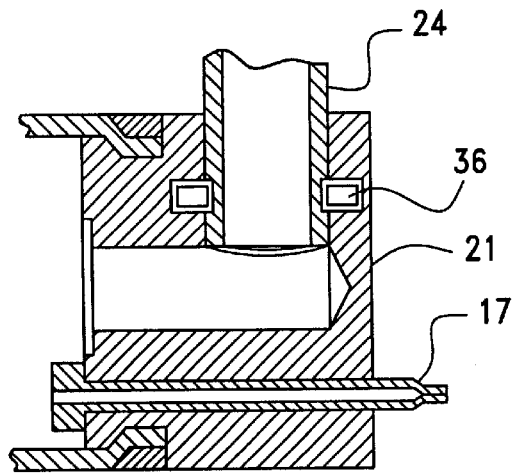
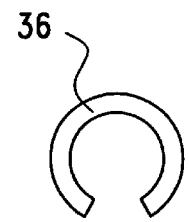
FIG. 1B
FIG. 1A
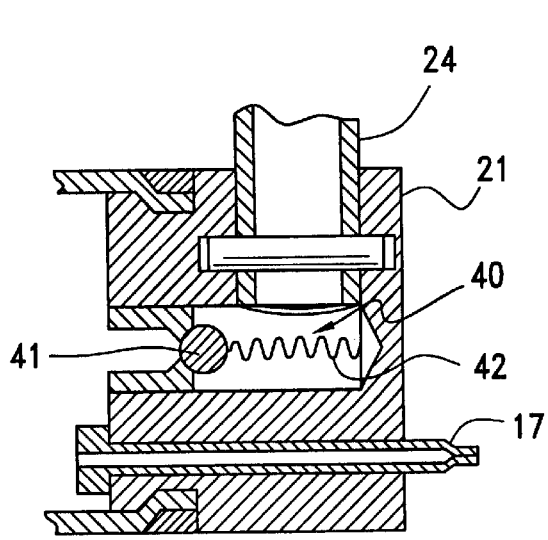
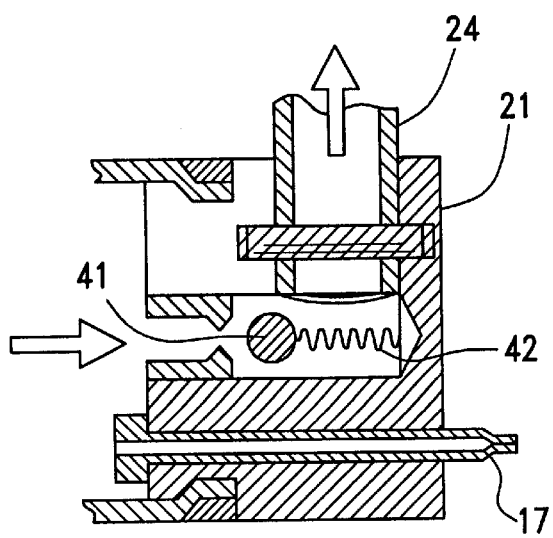
FIG. 1C
FIG. 1D

FIG. 8
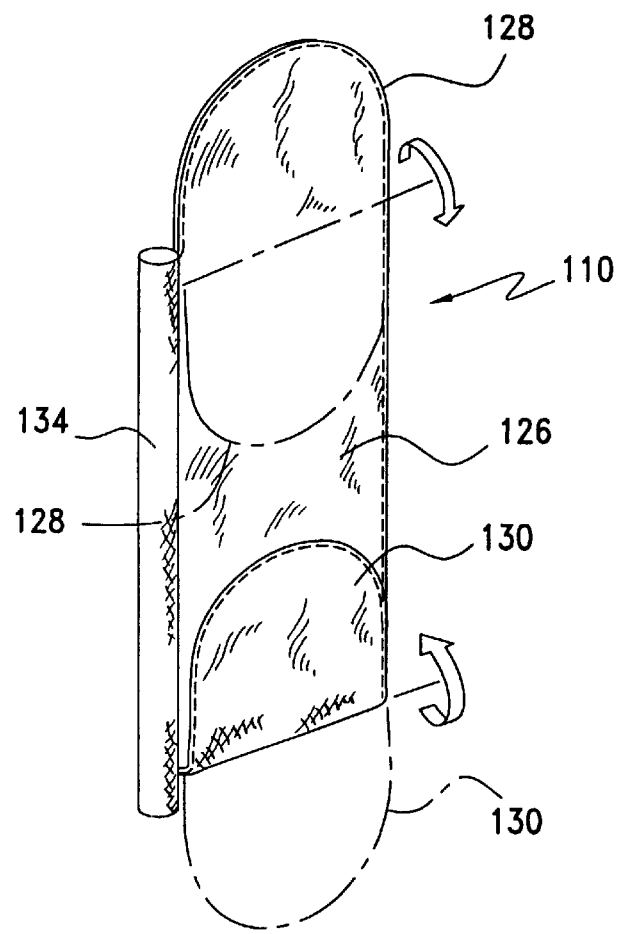
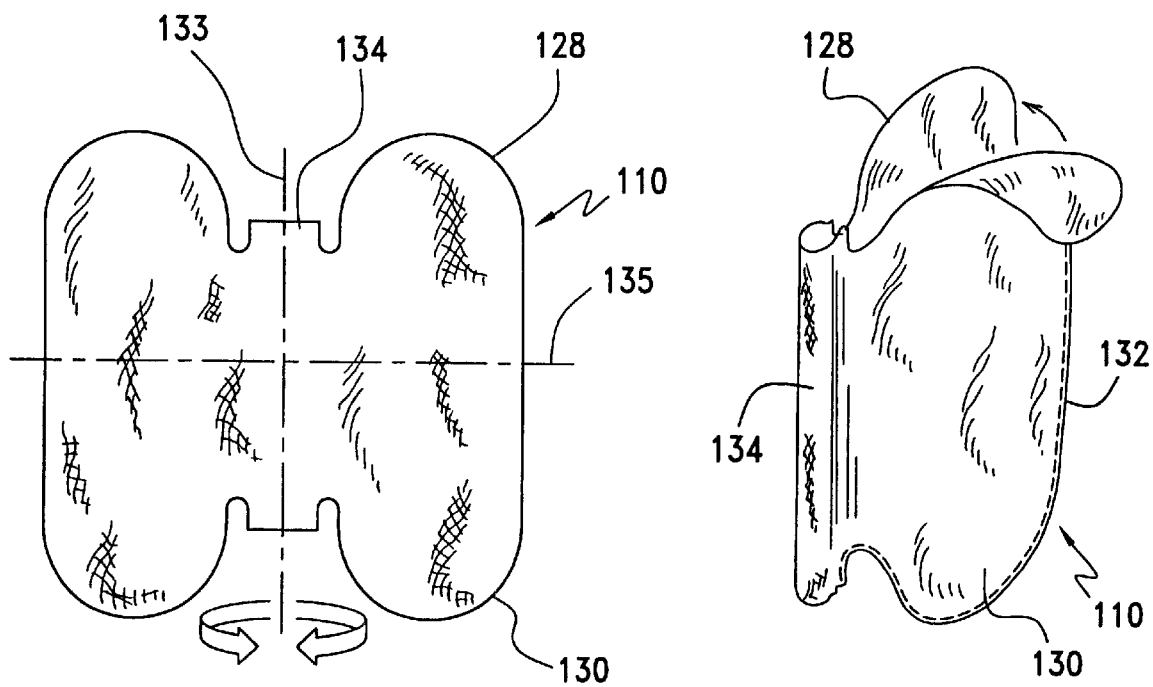
FIG. 9A  FIG. 9B

AIR BAG MODULE

This application is a continuation-in-part of U.S. patent application Ser. No. 08/999,923, filed Sep. 9, 1997, now U.S. Pat. No. 6,142,508, which is a continuation of application Ser. No. 08/664,973, filed Jun. 3, 1996, now abandoned.

FIELD OF THE INVENTION

The present invention is directed to an air bag passive restraint module for motor vehicles. In particular, the invention is directed to a self-contained air bag passive restraint module, which, in a single unit, contains an air bag, inflator, power supply, and impact sensor that may be retrofitted to existing vehicles.

BACKGROUND OF THE INVENTION

In addition to seat belts, government regulations require all new automobiles sold in the United States to be equipped with an air bag as a supplemental passive restraint for each of the front seat occupants. As a result, all new cars sold in the U.S. are equipped with dual front air bags that are designed to supplement the seat belts, and to reduce injuries in a frontal collision. Typically, a small air bag is located in the steering wheel to protect the driver, and a larger air bag is stored in the dash to protect the front seat passenger. In the event of a frontal collision, the air bags are deployed in a matter of milliseconds, preventing the driver and front seat passenger from impacting on the steering wheel and dash, respectively.

However, the air bags presently installed in most motor vehicles provide little or no protection for the lower body and limbs in frontal crashes, and fail to protect vehicle occupants when the vehicle is struck from the side. Side protection is particularly important because of the increased number of light trucks, such as pickups and sports utility vehicles ("SUV's"), on the road. These light trucks are considerably heavier than typical passenger cars, and have bumpers that are higher than those of automobiles; and can cause severe damage and injuries when a passenger car is struck from the side.

To prevent injuries in side impacts, a few automobile manufacturers have begun to offer side air bags that provide head protection for front passengers in side collisions. However, side air bags are not available in most automobiles, and no manufacturer offers a vehicle equipped with front air bags for rear seat passengers. Moreover, prior art air bags are difficult, if not impossible, to install in any position, including, e.g., in the steering wheel, dash, or side of the vehicle, in existing vehicles that lack factory installed air bags. This is due, at least in part, to a lack of an acceptable inflator, and the need to wire the impact detector of such an air bag into the electrical system of the vehicle.

In addition to being difficult, if not impossible to retrofit prior art air bags in existing vehicles, prior art air bag inflators are relatively inefficient thermodynamically, and, thus, require an excessive amount of pyrotechnic material, resulting in a relatively large inflator size with resultant difficulties in packaging the inflator into tight structural spaces. The relatively slow inflation rate of certain prior art inflators is also a major disadvantage. The relatively slow inflation rate is acceptable for the deployment of a dash or steering wheel mounted air bag, which are positioned relatively close to the vehicle occupants they are designed to protect. However, air bags located in a vehicle in positions other than the steering wheel or dashboard may have less than one fourth the time available for, e.g., a dash mounted air bag to deploy to provide protection in an impact, as the vehicle occupant is far closer to the interior surface of the vehicle. This reduced distance substantially reduces the time available for deployment of an inflatable restraint, such as the side bags discussed above and knee bolsters that prevent an occupants knees from impacting on the lower part of the dashboard, and prevent the occupant from "submarining" under the seat belts.

Therefore, a need exists for an air bag module, capable of rapid inflation, that can be installed in new vehicles and in existing vehicles to provide a protective air bag at locations where such an air bag was not previously available. The present invention provides such a self-contained air bag module.

SUMMARY OF THE INVENTION

The present invention is directed to a self-contained air bag module that comprises an air bag having an interior volume in fluid communication with a high thermal efficiency inflator, where the high thermal efficiency inflator is adapted for producing a sufficient quantity of a gaseous product to substantially inflate the air bag, and an impact detector in electrical or mechanical communication with the initiator of the high thermal efficiency inflator. The preferred high thermal efficiency inflator comprises a housing having an inner surface, defining an interior volume. The housing contains a pressurized gas at a first pressure in the interior volume and a pyrotechnic material for producing heat upon combustion, where the pyrotechnic material has a burn rate that is accelerated at the first pressure in comparison to the burn rate at a pressure of one atmosphere. The pyrotechnic material is stored within the interior volume of the housing at a distance from the inner surface of the housing, such that the stored pyrotechnic material is subjected to the first pressure of the pyrotechnic material, and the pyrotechnic material, in and of itself, is substantially free of thermal contact with the housing before combustion of the pyrotechnic material.

The preferred high thermal efficiency inflator further comprises an ignitor for initiating combustion of the pyrotechnic material upon receipt of an initiation signal; and means for maintaining the pressurized gas at the first pressure within the interior volume, and to open when the gas attains a predetermined second, higher pressure upon heating of the pressurized gas by combustion of the pyrotechnic material to allow an inflation gas to pass from the housing. In the preferred inflator, the pyrotechnic material is present in an amount sufficient to produce at least about 20 mole percent of the inflation gas, and the pressurized gas is present in an amount sufficient to produce up to about 80 mole percent of the inflation gas.

The first pressure of the gas in the preferred high thermal efficiency inflator is sufficiently high to produce an aerodynamic drag on burning pyrotechnic material passing through the gas, thereby slowing the burning pyrotechnic material, such that the drag produced on the burning pyrotechnic material and the distance between the stored pyrotechnic material and the inner surface of the housing are sufficiently great that, upon combustion of the pyrotechnic material, contact between a sufficient amount of the burning pyrotechnic material and the inner surface of the housing is prevented to allow at least about 90 percent of the heat produced by the combustion of the pyrotechnic material to be transferred to the inflation gas, so that no more than about 10 percent of the heat is transferred to the housing, resulting in a thermal efficiency of the high thermal efficiency inflator of at least about 90 percent.

In the most preferred self-contained air bag module of the invention, the pyrotechnic material in the inflator is located within the inflator housing in a frangible container that ruptures upon combustion of the pyrotechnic material, or in a container formed from a combustible material that burns upon combustion of the pyrotechnic material, releasing heat. Preferably, the combustible material is deep draw steel, aluminum or a combination of palladium and aluminum.

In an alternative embodiment, the pyrotechnic material is located within the housing in a container comprising a plug formed from a frangible or combustible material, such that, upon combustion of the pyrotechnic material, the plug ruptures or burns, allowing particles of burning pyrotechnic material to pass through the gas, transferring heat to the gas. The container may also define a plurality of apertures or pores, where the apertures or pores are of a sufficient size and a sufficient number to allow combusting particles to pass into the interior volume from the porous container through the pores, thereby heating the pressurized gas. In addition, the pyrotechnic material may be stored within the housing in the form of an extruded stick of the material.

Preferably, the distance between the stored pyrotechnic material and the inner surface of the housing is at least about 0.25 inch, and is more preferably at least about 0.5 inch. The first pressure at which the pressurized gas is stored is at least about 4,000 psi, preferably, about 5,000 to about 7,000 psi, and most preferably about 6,000 psi. During operation of the self-contained air bag module of the invention, the inflation gas within the inflator attains a peak operational pressure of from about 12,000 psi to about 20,000 psi, preferably, from about 15,000 psi to about 17,000 psi, and, most preferably, about 16,000 psi. The second pressure, at which the means for maintaining the pressurized gas at the first pressure opens is typically from about 7,000 to about 11,000 psi, and is preferably from about 8,000 to about 10,000 psi.

In the self-contained air bag module of the invention, the pyrotechnic material in the inflator is typically present in an amount sufficient to produce from about 10 to about 60 mole percent of the inflation gas, and, typically, comprises ammonium nitrate oxidizer and an energizer. Useful energizers include RDX (cyclotrimethylene trinitramine, sometimes referred to as "Royal Dalton Explosive"); HMX (cyclotetramethylene tetranitramine, sometimes referred to as "His/Her Majesty's Explosive"); CL20 (hexanitrohexaazaisowurtzitane, the "CL" referring to the Naval Surface Warfare Center, China Lake, Calif.); TNX (trinitroxylene); NQ (Nitroguanidine); NTO (5-nitro-2,4-dihydro-3H-1,2,4-triazolone); TAGN (Triaminoguanidine nitrate); PETN (Pentaerytlritol tetranitrate) TATB (Triaminotrinotrobenzene) TNAZ (1,3,3-Trinitroacetidine) and mixtures thereof. Preferably, the pyrotechnic material comprises ammonium nitrate, RDX, and a cellulose acetate binder, and, most preferably, comprises about 60 weight percent ammonium nitrate, about 36 weight percent RDX, and about 4 weight percent cellulose acetate binder, such that the pyrotechnic material has a burn rate of 20,000 m/s. The pyrotechnic material may be in the form of an extruded stick, a fine powder, flakes, granules, or other particles.

The pressurized gas within the inflator is preferably a chemically inert gas having a thermal conductivity of no more than about 250 W/cm·° C. at 25° C., and is preferably argon, or a mixture containing argon. In addition, at least a portion of the housing is preferably formed from a material having a thermal conductivity at 25° C. of less than about 1 Watts/cm·° C., such as low thermal conductivity metal, ceramic, epoxy, fiber glass, and nylon.

The impact detector typically comprises an actuating arm configured and adapted to move at least one switch arm upon impact, thereby initiating a timing circuit and charging a capacitor with current from a battery, such that when the charged capacitor is discharged after a preset period of time, operation of the inflator is initiated.

The self-contained air bag module preferably further comprises a compartment containing the air bag, wherein the compartment is configured and adapted for attachment to an interior portion of a vehicle to provide protection for an occupant of the vehicle. Preferably, the compartment comprises at least one flap or door that pivots open to allow inflation of the air bag.

The air bag preferably comprises a body portion, having an interior volume, a first end, a second end, and a length, a first flap attached to the first end, and having an interior volume in fluid communication with the interior volume of the body portion, a second flap attached to the second end, and having an interior volume in fluid communication with the interior volume of the body portion, and a root portion, extending along the length of the body portion, in fluid communication with the interior volume of the body portion and the inflator; wherein, for storage in the compartment, the first flap and the second flap are folded across the body portion, and the air bag is spirally wound in a tight roll that unwinds during inflation.

The invention is further directed to a method of protecting an occupant of a vehicle in a collision involving the vehicle, using the self-contained air bag module of the invention.

BRIEF DESCRIPTION OF THE DRAWINGS

FIG. 1a is a fragmentary sectional view through the inflator of FIG. 1 illustrating one embodiment of a rotatable conduit for directing gasses from within the inflator housing to an inflatable member such as an inflatable belt;

FIG. 1b is a plan view of a C shaped snap ring adapted to permit rotation of the conduit;

FIGS. 1c and 1d are fragmentary sectional views through the inflator of FIG. 1 illustrating one embodiment of a popoff valve adapted for controlling passage of heated gasses in the closed and open positions, respectively;

FIG. 8 illustrates an air bag useful in the invention.

FIGS. 9a and 9b illustrate the construction of an air bag useful in the invention.

DETAILED DESCRIPTION

Figure 1:
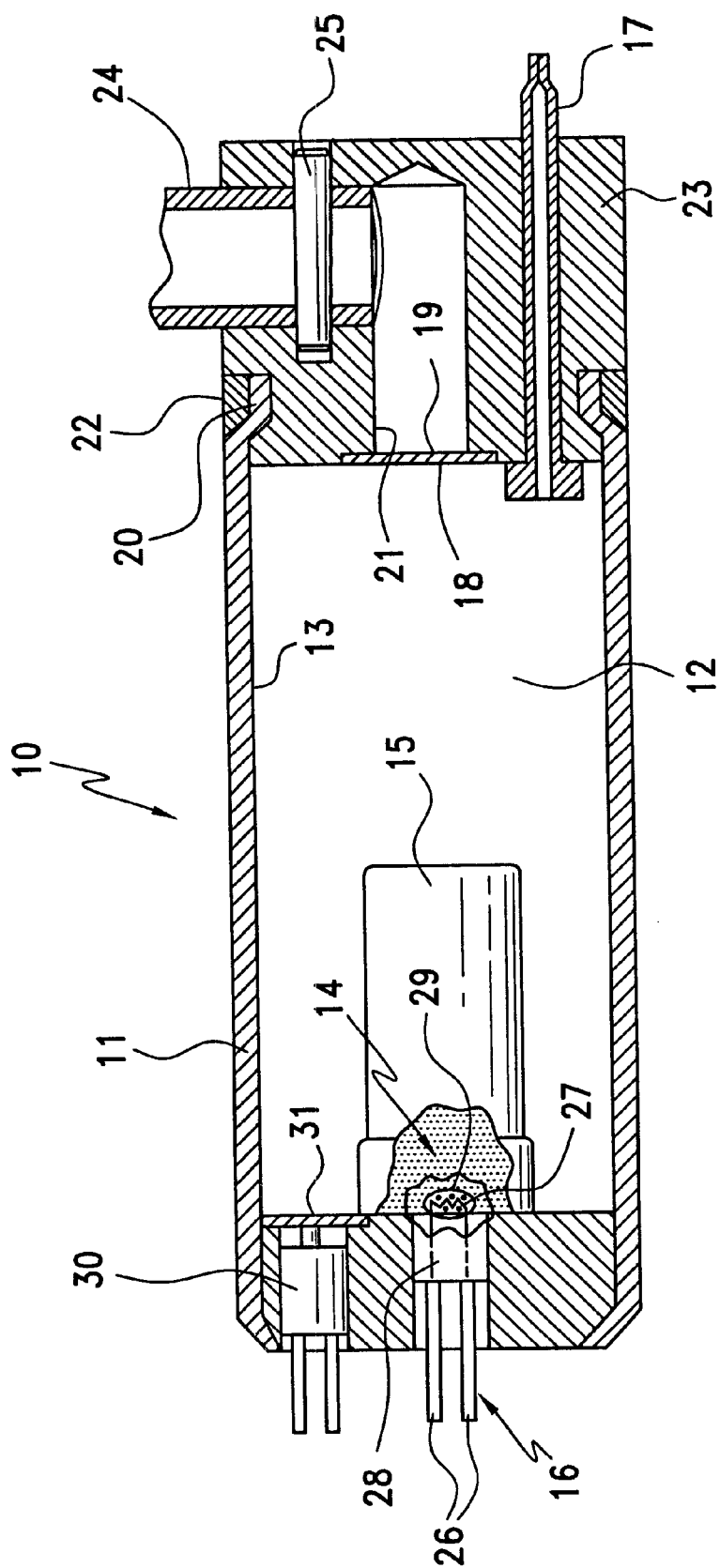
FIG. 1 is a sectional view of a first embodiment of the high thermal efficiency inflator of the invention.

As used herein, the term "hybrid inflator" refers to an inflator device that relies upon the combined effect of the release of a stored pressurized gas and the combustion of a pyrotechnic gas generating material within the pressurized gas to provide an inflation gas.

The term "high thermal efficiency inflator" refers to a hybrid inflator that is constructed in a manner that maximizes the transfer of heat energy to the inflation gas, so that at least 90 percent of the heat generated by the combustion of the pyrotechnic material used in the inflator is transferred to the pressurized gas and combustion products, such that, during operation, the increase in temperature of the housing or body of the inflator is substantially less than the increase in prior art inflators, and the amount of pressurized gas and pyrotechnic material necessary to provide a given volume of inflation gas at a given pressure is minimized.

As used herein, the term "thermal conductivity" refers to a proportionality constant that is related to the heat flow or time rate of heat transfer by conduction through a material as given in the equation $$\Delta Q/\Delta T = KA(T_2 - T_1)/I,$$

where $\Delta Q/\Delta t$ is the time rate of heat transfer, A is the cross sectional area across which the heat flows, $T_2 - T_1$ is the temperature differential across the material, I is the length across which the heat flows, and K is the proportionality constant that represents the thermal conductivity. Common units for K are Wafts/cm·° C., Joules/s·cm·° C., and Cal/s·cm·° C. Also, as used herein, a "low thermal conductivity material" is any solid material having a thermal conductivity at 25° C. of less than about 1 Watt/cm·° C., preferably, less than about ½ Watt/cm·° C., and a "low thermal conductivity gas" is any gas having a thermal conductivity at 25° C. of less than about 250 Watts/cm·° C., preferably, less than about 200 Wafts/cm·° C.

As also used herein, the term "thermal efficiency" refers to that portion of the total amount of heat produced by the combustion of the pyrotechnic material that is absorbed by the pressurized gas and retained by the gaseous combustion products. That is, the thermal efficiency is the ratio of the amount of heat transferred to, and retained by the inflation gas during the combustion of the pyrotechnic material to the total amount of heat released during combustion. The greater the portion of the heat generated that is transferred to, and retained by the inflation gas, the higher the thermal efficiency of the inflator. By maximizing the thermal efficiency of the high thermal efficiency inflator, its size and Weight can be minimized, because a smaller amount of pyrotechnic material is required, allowing the use of a lighter housing.

As also used herein, the term "chemically inert gas" refers to any gas that does not undergo a chemical reaction under the conditions of temperature and pressure within the inflator prior to or during the functioning of the inflator.

The present invention is directed to an air bag module that comprises an air bag, an inflator device, a power supply, an impact detector, and an electronic or mechanical mechanism that initiates the production of inflation gas by the inflator device upon receipt of a signal from the detector. The modular unit is capable of lasting for years without outside power or maintenance. The container is preferably made of or surrounded by material that acts as a shield to prevent or reduce entrance of electromagnetic waves. Because the air bag module of the invention can supply its own power, it can be installed in new vehicles or as a retrofit in existing vehicles, including automobiles, buses, passenger trains, and airplanes, without requiring connection to the electrical system of the vehicle.

The air bag module of the invention is sufficiently compact that it can be safely installed at almost any location of a vehicle where protection is required. Units may vary in size and shape for location in the vehicle to protect when activated the knees, thighs, sides or other parts of occupants. The unit may be mounted in the seat, frame or other location of the vehicle to protect any portion of the occupant. For example, the module may be installed upon or within the A and B pillars of a motor vehicle, on the outboard side of a seat to provide side impact protection for both front and rear seat passengers, under the dash to serve as a knee bolster to provide additional protection to front seat passengers in a frontal collision, on the back of the front seat to provide additional protection for rear seat passengers, and in or near seat head restraints to prevent whiplash injuries in rear collisions. The module of the invention can also be mounted on the steering wheel or on the dash of older cars that are not equipped with air bags. Preferably, the air bag module of the invention is used as a knee bolster and/or to provide protection in side impacts.

The compact dimensions and internal electronic controls of the air bag module of the invention also allow for easy installation of the module on the backs of seats in airplanes, buses, and passenger trains. Because each unit contains an impact detector, e.g., an accelerometer, required to detect a collision and initiate inflation of the air bag in the unit, inflation of each unit occurs individually when required, i.e., each unit inflates only after the impact forces sensed by the detector in the individual unit are sufficiently high to provide the signal required to initiate inflation of the air bag. As a result, those units toward the front of a long vehicle, such as an airplane, bus, or passenger train, which are subjected to the forces of an impact first, will inflate before units to the rear of the vehicle, which do not experience the impact forces until after the initial impact. Each air bag will deploy for each individual passenger only when the force of the impact acting on the passenger and the detector of the unit requires deployment of the air bag for that passenger.

Typical prior art inflators, such as those used with dash and steering wheel mounted air bags presently installed in passenger cars, are relatively inefficient thermodynamically, and, thus, require an excessive amount of gas generating pyrotechnic material, resulting in increased inflator size and a relatively slow inflation rate. The size and inflation rate of such prior art inflators are unacceptable for many applications, such as in inflatable seat belts, knee bolsters, and in side bags for the prevention of injuries in side impacts. In those applications where the distance between a vehicle passenger and the interior of the vehicle is considerably less than that between a front passenger and the dash, the time available for the deployment of an inflatable restraint, e.g., a side bag, is substantially less than that available in other applications. Moreover, the relatively large size of prior art inflators makes their installation in a self-contained module designed for after market installation difficult, if not impossible.

An inflator useful in the module of the present invention is preferably a compact hybrid inflator, i.e., an inflator that produces inflation gas using both a pressurized gas and a pyrotechnic gas generating composition. The inflator preferably has a high thermodynamic efficiency and an inflation rate that is substantially more rapid than prior art inflators. Preferably, the inflator is a high thermal efficiency inflator of the type disclosed in copending application Ser. No. 09/444,730, filed Nov. 18, 1999, U.S. Pat. No. 6,199,905, which is a continuation-in-part of co-pending U.S. application Ser. No. 08/587,773, filed Dec. 22, 1995, U.S. Pat. No. 6,142,511, the contents of which are incorporated herein to the extent necessary to supplement this specification.

A high thermal efficiency inflator of the type useful in the invention is generally illustrated in FIG. 1. As illustrated in FIG. 1, high thermal efficiency inflator 10 comprises a housing 11, having an inner surface 13, which defines an interior volume 12. Housing 11 is preferably formed from or lined with a low thermal conductivity material of a type well known in the art, such as, for example, a low thermal conductivity metal, ceramic, epoxy, fiber glass, nylon, or other suitable material having a low thermal conductivity. Most preferably, housing 11 has a heat reflective inner surface. Interior volume 12 contains a highly pressurized, chemically inert gas, having a low thermal conductivity, such as argon, which has a thermal conductivity of about 162 W/cm·° C. Typically, the gas is stored at a pressure of at least about 4,000 psi, preferably, from about 5,0013 to about 7,000 psi, most preferably about 6,000 psi.

A pyrotechnic material 14, of any type known in the art capable of producing primarily gaseous combustion products and heat, is located within housing 11, preferably, in such a manner that pyrotechnic material 14 is subjected to the pressure of the gas, and, more preferably, is exposed to the pressurized gas. Pyrotechnic material 14 may optionally be contained in a holder 15, which is preferably formed from a frangible or combustible material, and which may also, define one or more apertures to permit passage there through of the compressed gas and/or gaseous combustion products. Pyrotechnic material 14 and/or optional holder 15 should be mounted or supported by an insulating material having a very low thermal conductivity, which may form a part of the housing, such as end plug 28, as shown in FIG. 1. Combustion of pyrotechnic material 14 is commenced by an igniter, which may be of any type known in the art. Preferably, the ignitor is a pyrotechnic squib 16 as shown in FIG. 1, but may also be a mechanical device, such as a firing pin. Where a pyrotechnic squib 16 is used as the ignitor, the squib is preferably also subjected to the pressure of the pressurized gas.

Pyrotechnic squibs and other useful igniters for initiating combustion of pyrotechnic materials are well known in the art. Squib 16, as illustrated in FIG. 1, typically comprises a pair of connector pins 26 that extend through a plug 28 formed from an insulating material to prevent an electrical short circuit. As with all components of high thermal efficiency inflator 10, plug 28 is preferably formed from a low thermal conductivity material, such as those discussed above for use in the housing. Connector pins 26 are connected electrically to a bridge wire 27 that is coated with or in thermal contact with a first firing compound 29, which is also in thermal contact with pyrotechnic material 14. Preferably, first firing compound 29 is also exposed to the pressure of the pressurized gas. When operation of high thermal efficiency inflator 10 is required, a voltage is applied across connector pins 26, which produces a current in bridge wire 27, heating the wire, and rapidly igniting first firing compound 29, which, in turn, ignites pyrotechnic material 14.

The pressurized gas within interior volume 12 is typically introduced into interior volume 12 of housing 11 using any means known in the art for filling a container with a high pressure gas, such as through a fill port 17, which may comprise a hollow pin, and which may be sealed by any means known in the art, such as by welding, after the gas has been inserted into the housing. A seal 18 situated within or across an outlet aperture 19 maintains the pressure of the gas at a first pressure within interior volume 12 of the housing 11, but opens when the gas attains a predetermined, second higher pressure upon combustion of pyrotechnic material 14. Seal 18 may be a rupturable diaphragm, as shown in FIG. 1, a popoff valve 40, as shown in FIGS. 1c and 1d, or any other openable sealing means known in the art. Popoff valve 40 is typically a closure valve or ball 41 held in place over outlet aperture 19 by pressure provided by a spring or pneumatic device 42, or any other device known in the art that will open rapidly at a predetermined pressure, and allow for the rapid release of the gas. Preferably, seal 18 is a rupturable diaphragm, as shown in FIG. 1. Inflator 10 may also be equipped with an outlet gas diffuser over the outlet aperture to facilitate the release of the inflation gas into the object to be inflated.

As shown in FIG. 1, an optional insert 21, which may comprise a manifold 23, may be affixed to housing 11 by any means known in the art that will maintain the pressurized gas within housing 11, such as, e.g., by crimping housing 11 to manifold 23 at 20. Where housing 11 is crimped, a ring 22, preferably formed from a flexible elastomer, may be disposed in housing 11 adjacent crimp 20 to provide a seal for preventing gas leakage from the housing. Housing 11, insert 21, and manifold 23 are typically formed from a material capable of maintaining the gas at the desired pressure, and which itself has a low thermal conductivity or which contains a coating on the interior surface formed from a material having a low thermal conductivity. That is, housing 11, insert 21, and manifold 23 may be formed from or lined with a low thermal conductivity metal, ceramic, epoxy, fiber glass, nylon, or other suitable material having a low thermal conductivity, all of which are well known in the art.

Although high thermal efficiency inflator 10 is sufficiently small to be positioned such that outlet aperture 19 may be directly attached to the inlet of an inflatable object, such as an inflatable restraint, interior volume 12 of housing 11 may also be placed in fluid communication with a conduit 24 attached to or part of manifold 23 for directing the inflation gas to the restraint or other inflatable member. Conduit 24 may be a pipe, tube, or other structural conduit that is preferably not distorted or collapsed during the operation of inflator 10. Where manifold 23 is present, exit aperture 19 typically communicates with a conduit 24, extending from the manifold 23. Conduit 24 may be fixedly attached to manifold 23 with, e.g., a pin 25 or other means known in the art. Alternatively, conduit 24 may be rotatably affixed with, e.g., a snap ring or by other means known in the art to allow rotation about the axis of exit aperture 19 or conduit 24 to assist in providing the most desirable position for inflating an air bag. Such a rotatable conduit is illustrated in FIG. 1a. As shown therein, rotation of conduit 24 is made possible in a manner well known in the art by snap ring 36, which at least partially surrounds a base portion of the conduit. One embodiment of such a snap ring is illustrated in FIG. 1b, although as indicated above the invention is not limited to use with snap rings. It will be appreciated that conduit 24 may be omitted if the inflator is intended to communicate directly with the inflatable object.

Optionally, a switch 30, as shown in FIG. 1, is disposed in the housing 11, and associated with a diaphragm 31, which is pressed against switch 30 by pressure of the stored gas in housing 11 when the gas pressure is at or exceeds the minimum pressure required for the proper functioning of the inflator. Should the pressure of the gas in housing 11 drop to a value less than that required for the proper functioning of the inflator, diaphragm 31 becomes displaced from the switch 30, closing switch 30, and completing an electrical circuit associated with a warning device, such as a light (not shown), to indicate that inflator 10 is not operative. The operation of switch 30 may provide a signal to associated electronic circuitry. This signal provides an indication that inflator 10 is in a defective state. Such associated circuitry is believed to be known to a person of ordinary skill in the art.

Pyrotechnic material 14 may be any pyrotechnic material known in the art having a rapid burn rate that is accelerated by the pressure of the gas within housing 11. Preferably, the pyrotechnic material is a gas generating compound that is used in an amount sufficient to produce at least about 10 percent, preferably from about 10 to about 80 percent, more preferably, from about 20 to about 60 percent, and, most preferably from about 40 to about 60 percent of the inflation gas on combustion. The preferred pyrotechnic material is one that produces primarily gaseous byproducts, so that upon combustion, gaseous combustion products and heat are released with little or no solids, i.e., "clinkers", and, thus, no filters are required, further reducing the required size and weight of the inflator. Typically, the preferred pyrotechnic material comprises at least one of ammonium nitrate, nitroguanidine, or guanidine nitrate as an oxidizer, together with an energizer and, optionally, a binder. Useful energizers include, but are not limited to RDX, HMX, CL20, TNX, NQ, NTO, TAGN, PETN, TATB, TNAZ, or mixtures thereof. The most preferred pyrotechnic material comprises about 60 weight percent ammonium nitrate, about 36 weight percent RDX, and about 4 weight percent cellulose acetate binder, has a burn rate of 20,000 m/s, and, on combustion, produces byproducts and end products that do not require a filter in the high thermal efficiency inflator. The preferred pyrotechnic material may be in the form of stick or sticks, a fine powder, flakes, granules, or other particles with granules being preferred to provide control of peak inflator pressure by controlling the rate of ignition and combustion, with a granule size of about 1 mm (0.04 inch) to about 3 mm (0.12 inch) diameter proving ideal. Most preferably, the pyrotechnic material is in the form of granules that are lightly packed into a frangible or combustible holder. Although the following description typically refers to granules of the pyrotechnic material, the form of pyrotechnic material required for a particular application will be readily apparent to one of ordinary skill in the art in light of the present disclosure.

However, the burn rate of the entire volume of the pyrotechnic material will increase as the mechanical and thermal contact between granules increases, thereby reducing the overall burn time, by reducing the time for transfer of ignition one granule to the other. That is, as the particles or granules of the pyrotechnic material are more tightly compacted together, the time required for the complete combustion of all of the pyrotechnic material decreases.

As noted above, in the most preferred embodiment, pyrotechnic material 14 is contained within interior volume 12 of housing 11 in an optional holder 15 in the form of lightly packed granules. Most preferably, holder 15 has a diameter of from about 6.3 mm (0.25 inch) to about 10.1 mm (0.4 inch), and is formed from a frangible or a combustible material that will rapidly rupture, burst, or burn upon the ignition of the pyrotechnic material. Preferably, holder 15 is combustible, and releases, rather than absorbs, heat upon combustion. Examples of such combustible materials include pyrofoil, a combination of palladium and aluminum, or deep draw aluminum, which will burn with excess oxidizer. As will be readily appreciated, where optional holder 15 is not used, the pyrotechnic material must be in a form that will hold its shape, such as an extruded stick, compressed granules, or particles of the material mixed with a binder, allowing stored pyrotechnic material 14 to be properly positioned within the housing of the high thermal efficiency inflator.

The use of a holder formed from a frangible or combustible material allows the granular material, upon deflagration, to rapidly exit the holder, and to travel through substantially all of the gas, transferring heat to the gas adiabatically as the burning granules travel through and contact the cool gas. By allowing each burning particle to travel through cool gas, the heat transfer occurs throughout the gas, rather than being confined to a single point within the gas, as occurs when the pyrotechnic material is confined. This maximizes the heat transferred to the gas, and also minimizes any pressure or temperature gradient within the gas charge.

Moreover, when the granules of pyrotechnic material are loosely packed within a frangible or combustible holder, there is a delay between the initiation of combustion of the pyrotechnic granules nearest the ignitor and the initiation of combustion of the other pyrotechnic granules. Each of the granules that is not initially ignited by the igniter is ignited at a later time by a previously ignited granule. This further minimizes the peak pressure and temperature within the gas. The more tightly packed the granules, the shorter the delay time between the initiation of combustion of the granules in thermal contact with the first firing compound of the ignitor and the combustion of the remaining granules. Where the pyrotechnic material is in the form of an extruded solid, the delay time is essentially zero, resulting in an extremely rapid release of inflation gas from the inflator.

Subjecting the pyrotechnic material to the high pressure of the gas within the interior volume of the housing has two effects on the pyrotechnic material. First, the high pressure increases the burn rate, so that individual granules burn in less than about 1 ms, and, preferably, no more than 0.5 ms. Second, the high pressure of the gas retards the movement of the granules by increasing the density of the gas and hence the aerodynamic drag on each particle, thereby slowing the movement of the burning particle through the gas. During combustion of the granules, substantially all of the granules are completely consumed as the granules pass through the gas in the housing. This results from the combination of the rapid burn rate and the drag of the gas on the granules, and substantially prevents contact of the burning granules of pyrotechnic material with the housing, thereby substantially reducing or, preferably, eliminating the transfer of heat energy to the housing. This provides the inflator with an extremely high thermal efficiency, such that at least 90 percent, and typically more than 95 percent, of the heat generated by the combustion of the pyrotechnic material is retained by combustion products or transferred to the pressurized gas.

In applications where the high thermal efficiency inflator will be subjected to physical or mechanical stress sufficient to rupture a frangible holder during periods of non-operation, other means must be provided to prevent the pyrotechnic material from being spilled into the interior volume in the housing, while maintaining the high thermal efficiency of the high thermal efficiency inflator. Because these alternative means of holding the pyrotechnic material tend to restrict the movement of the burning granules of pyrotechnic material upon ignition, they tend to confine the transfer of heat to only a portion of the gas, and absorb heat that would otherwise be transferred to the gas. As a result, during operation, the peak pressure and temperature within some of the gas charge within the high thermal efficiency inflator is increased, and there is a slight reduction in the pressure of the inflation gas and the thermal efficiency of the high thermal efficiency inflator in comparison to that of the most preferred embodiment, because of the uneven heating of the gas. That is, some of the gas is heated less than other portions of the gas. However, in any high thermal efficiency inflator in accordance with the invention, contact between the burning granules of pyrotechnic material and the housing and any other nongaseous portions of the high thermal efficiency inflator is minimized, so that little or no heat is transferred to any part of the high thermal efficiency inflator other than the pressurized gas. As a result, the total amount of heat retained by the combustion products and transferred to the gas in a high thermal efficiency inflator is at least 90 percent, and, thus, no more than about 10 percent of the heat is transferred to the housing or other components of the high thermal efficiency inflator. As a result, the temperature increase of the inflator during operation is minimized, and the temperature of the housing increases by no more than about 10 to about 12° F. (about 5 to about 7° C.) following initiation of the inflator.

Figure 2:
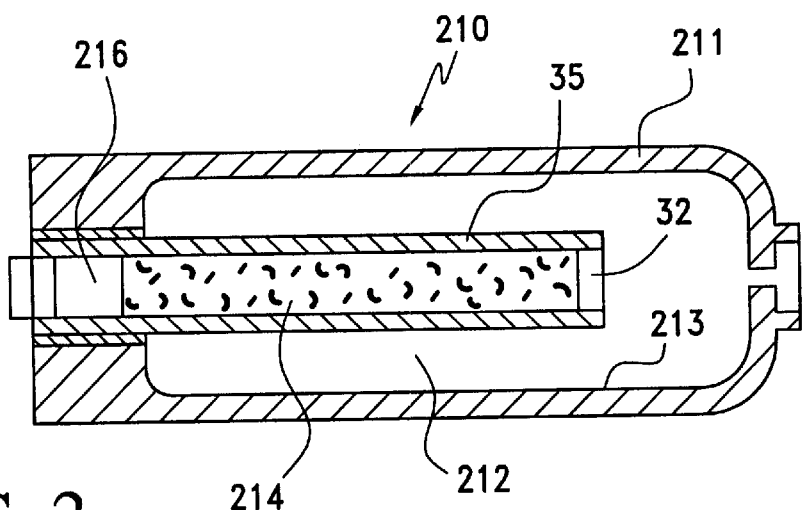
FIG. 2 is a sectional view of a second embodiment of the high thermal efficiency inflator of the invention.

In one embodiment of an inflator 210, as shown in FIG. 2, frangible holder 15, shown in FIG. 1, is replaced with a thin tubular holder 35, having a diameter of from about 0.6 inch (about 15 mm) to about 1 inch (about 25 mm). Thin tubular holder 35 may be made of any suitable material, such as, e.g., metal, plastic, or ceramic, and most preferably has a low thermal conductivity. Thin metal tubular holder 35 preferably has an end plug 32 formed from a frangible or combustible material, and is more preferably porous. Upon initiation of combustion of pyrotechnic material 214 within tubular holder 35, end plug 32 burns or breaks open, allowing the granules of pyrotechnic material 214 to travel longitudinally down the length of interior volume 212 within housing 211. The granules of pyrotechnic material are thus propelled through the pressurized gas due to the ignition of pyrotechnic material 214 by ignitor 216. Because of the high burn rate and the high pressure of the gas, substantially all of the granules are completely consumed before reaching inner surface 213 of housing 211, ensuring that little heat is transferred to housing 211.

As with the embodiment illustrated in FIG. 1 in which a frangible holder is used, there is a delay in the ignition of the granules of pyrotechnic material 214 most distant from the ignition source following initiation. As a result, although each particle burns in no more than about 0.5 ms, the total burn time for the pyrotechnic material is typically from about 2 to about 5 ms. This provides maximum contact between the burning granules and the cool gas, so that peak pressure and temperature, as well as the temperature and pressure gradients within the gas are minimized.

Figure 3:
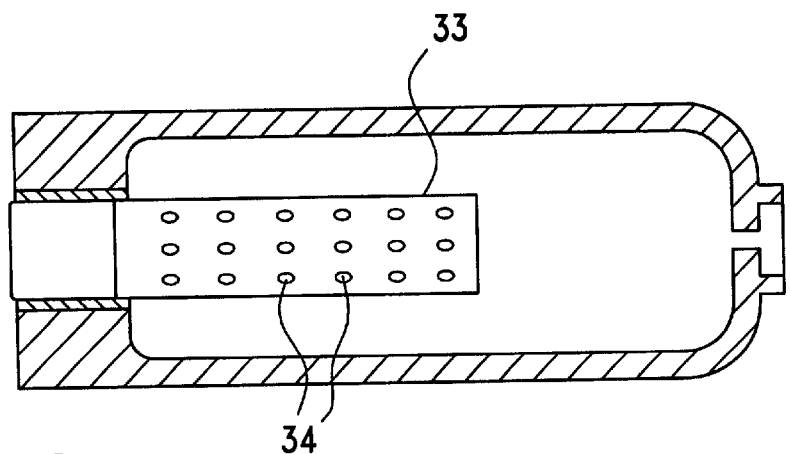
FIG. 3 is a sectional view of a third embodiment of the high thermal efficiency inflator of the invention.

In a further embodiment, as shown in FIG. 3, the pyrotechnic material (not shown) is contained in a porous holder 33, made from a thin material, typically a metal, having a very low heat capacity, i.e., the amount of heat absorbed by the holder during the operation of the inflator is no more than about 3 percent, and, preferably, no more than about 1 percent of the heat generated by the combustion of the pyrotechnic material, so that holder 33 absorbs a minimum amount of heat during the combustion of the pyrotechnic material, and can rapidly transfer any absorbed heat to the pressurized gas. Preferably, the pyrotechnic material is in the form of loosely packed granules, and pores 34 in holder 33 are slightly smaller than the granules of the pyrotechnic material contained therein. When pores 34 are of the appropriate size, the granules of pyrotechnic material, which decrease in size during combustion, can exit holder 33 with the gaseous combustion products produced by the pyrotechnic material, and travel through the cool gas, heating the gas and raising the pressure. Again, substantially all of the granules of the pyrotechnic material are completely consumed before reaching the inner surface of the housing.

The thermal efficiency of a high thermal efficiency inflator using such a porous holder may be lower than that of the embodiments described above. The amount of heat absorbed by holder 33, rather than being transferred to the gas, will typically be greater than that absorbed by frangible or combustible holder 15, because holder 33 typically has a greater mass, i.e., holder 33 contains more material, and, thus, can absorb a greater amount of heat. As a result, less of the heat energy from the combustion is available for increasing the gas pressure, and the thermal efficiency decreases. However, the thermal efficiency of a high thermal efficiency inflator using a porous holder 33 is still at least about 90 percent, which is far superior to that of prior art inflators.

In addition, because the movement of granules through the gas is decreased, larger pressure and temperature gradients are produced, resulting in locally higher peak pressure and temperature. This creates a shock wave in the pressurized gas that cause the seal to open early, rapidly releasing the gas from the high thermal efficiency inflator. Although it might be expected that this would provide a higher final pressure when an object is inflated with the high thermal efficiency inflator, the final inflation pressure is actually lower. Therefore, if the pores in the holder are sufficiently small that virtually none of the burning granules escape, the high thermal efficiency inflator can have an extremely high local peak pressure, i.e., on the order of 50 to 60 kpsi, and a lower inflation pressure is produced than can be obtained with more preferred embodiments, as described above.

Figure 4:
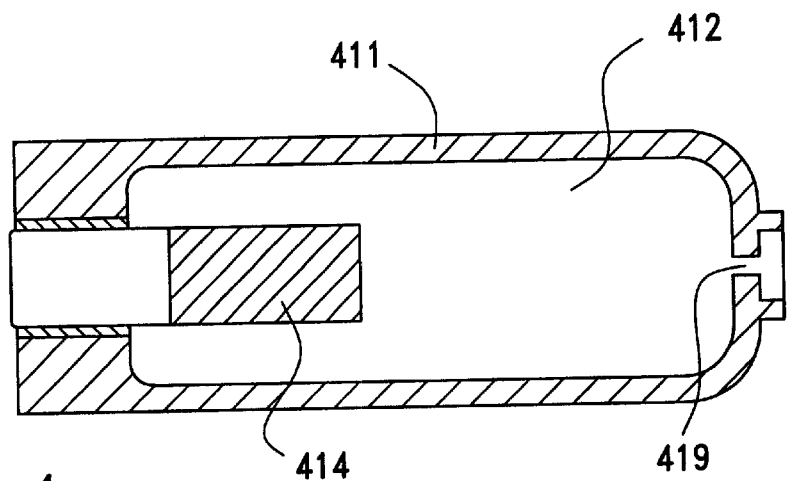
FIG. 4 is a sectional side view of a fourth embodiment of the high thermal efficiency inflator of the invention.

This effect may also be observed with frangible or combustible holders when the granules of pyrotechnic material are more tightly packed, but is best observed where the pyrotechnic material is in the form of an extruded microporous stick 414, preferably composed of a solvent processed propellant, most preferably having a porosity of at least 20% as shown in FIG. 4. FIG. 4 also illustrates housing 411, which defines volume 412 and outlet aperture 419. As the packing pressure of the granules of pyrotechnic material is increased, the delay between ignition of individual granules decreases, and the entire mass of pyrotechnic materials burns more rapidly. Where the pyrotechnic material is in the form of an extruded microporous stick, the entire mass of pyrotechnic material burns extremely rapidly because there is no spacing between granules to produce an ignition delay. As a result the granules of pyrotechnic material do not travel far through the pressurized gas during combustion, and that portion of the gas nearest the pyrotechnic material is heated to a significantly greater extent than the remainder of the gas, producing a significantly higher peak temperature and pressure in the heated portion of the gas than is observed in the rest of the gas, and higher temperature and pressure gradients. However, even though the peak pressure is significantly higher in this embodiment of the high thermal efficiency inflator, a high thermal efficiency inflator using a microporous stick of pyrotechnic material has a thermal efficiency that is significantly higher than that of prior art hybrid inflators. Where the outer surface of a prior art hybrid inflator may have an increase in temperature of over 100° F. (55° C.), the temperature increase of the housing of a high thermal efficiency inflator is typically no more than about 10° to about 12° F. (about 5° to about 7° C.), and is often less than about 7° F. (about 4° C.). This clearly demonstrates that substantially all of the heat generated by the combustion of the pyrotechnic material goes into the inflation gas.

The internal dimensions and the burning time of the pyrotechnic material are also important factors in determining the thermal efficiency. Clearly, if a burning particle of pyrotechnic material contacts the inner surface of the housing, heat will be transferred to the housing, decreasing the amount of heat available to heat the gas, and, thus, decreasing the thermal efficiency of the high thermal efficiency inflator. Therefore, for a given amount of pyrotechnic material, there is a minimum allowable internal diameter or cross section for the housing. For example, about 10 to 20 g of the preferred pyrotechnic material described above in a 1.5 inch internal diameter housing, having a length of about 3.5 inches and a volume of 6 cubic inches, will essentially burn completely without contacting the inner surface of the housing. In such a high thermal efficiency inflator, the outer surface temperature of the housing increases by only about 10° to 12° F. when the inflator functions, clearly demonstrating that little heat energy is absorbed by the housing during operation, resulting in the high thermal efficiency for the inflator. However, the outer surface of a similar inflator having the same volume and the same amount of pyrotechnic material, but an internal diameter of only 0.7 inch will have a change in temperature of over 80° F. (45° C.). This is because the burning pyrotechnic material contacts the inner surface of such an inflator, transferring more heat to the housing, and less to the gas.

It is possible to calculate the approximate distance that the granules will travel during combustion using the equation $$d = \tfrac{1}{2} a t^2$$

where d is the distance the granule travels while under an acceleration, a, for time, t. The acceleration of a granule will be equal to the net force acting on the granule (i.e., the net outward pressure on the granule multiplied by the effective cross sectional area of the particle) divided by the mass of the granule. As will be understood by one of skill in the art, the net pressure, is the difference between the pressure forcing the granule to move through the gas, minus the drag on the granule as it is propelled through the pressurized gas. The difference in pressure is caused by the release of heat and gaseous combustion products at the center of the inflator where the pyrotechnic is initially concentrated. That is, the pressure in the center of the inflator during combustion of the pyrotechnic material is higher than the pressure in the surrounding gas. Assuming a net average propelling pressure of 800 psi on a granule that has an effective cross section of about 0.002 square inch, a unit mass of about 0.003 g, and a combustion time of 0.0001 seconds (100 µs), the distance traveled by the granules will be about 0.9 inches (2.4 cm). Similarly, where the combustion time of the granules is within the preferred range of 0.1 to 0.5 ms, the distance traveled will be about 0.1 in to about 1.0 in.

The volume of the high thermal efficiency inflator is small when compared to prior art inflators. For example, for use with an inflatable seat belt, the required volume of the inflator is no more than two cubic inches, which is considerably smaller than prior art inflators that require a volume of at least about 10 cubic inches to produce the same amount of gas due to the thermal inefficiencies inherent in their construction.

Because of the high pressure and small volume of the gas and the short burn time of the pyrotechnic material, the inflator is able to respond almost instantaneously when production of gas is necessary, such as when the inflation of an inflatable restraint device is required during a collision involving a vehicle. In particular, the high thermal efficiency inflator typically requires no more than about ten milliseconds ("ms") to provide sufficient inflation gas to inflate an inflatable restraint device, such as the inflatable portion of an inflatable belt or a side air bag, after being triggered. In contrast, a typical prior art inflator normally requires 40 to 50 ms. The relatively small amount of pyrotechnic material used in the inflator of the invention also minimizes the amount of pyrotechnic byproducts produced during operation of the inflator.

Moreover, because all of the components of the high thermal efficiency inflator are contained within a small volume, the high thermal efficiency inflator may be positioned within the inflatable or in such a manner that the inflation gas flows from the high thermal efficiency inflator through a short opening or conduit directly into the inflatable restraint device. As a result, the total volume into which the inflation gas must flow is significantly smaller than that required with prior art inflators. This reduces the amount of inflation gas required to inflate the inflatable device, further reducing the volume required for the high thermal efficiency inflator, and enabling the high thermal efficiency inflator to inflate an inflatable device, such as an inflatable restraint device, almost instantaneously when triggered.

The overall time variation in the function time of the high thermal efficiency inflator with temperature is virtually insignificant compared to prior art inflators, even when subjected to a variation in temperature over a range of from −65° to +175° F. (−54° to 80° C.) at ignition. This is due, at least in part, to the short burning time of the pyrotechnic material. For example, if the 20 percent variation in the burning time of the propellant is assumed for the high thermal efficiency inflator, over the temperature range discussed above this would result in a variation of no more than 0.2 ms, where the nominal burning time is less than 1 ms. In contrast, in a prior art inflator having a 40 to 50 ms function time, the same variation in temperature results in a variation of from about 8 to about 10 ms. As a result, the high thermal efficiency inflator provides significantly more consistent performance and significantly greater protection than that provided by prior art inflators.

As discussed above, in the high thermal efficiency inflator, at least about 10 percent, preferably from about 10 to about 80 percent, and, most preferably, from about 40 to about 60 percent, of the inflation gas is typically produced from the combustion of the pyrotechnic material with the remainder produced by the expansion of the pressurized gas, and, thus, the high thermal efficiency inflator may be referred to as a hybrid inflator. However, as one of skill in the art will readily understand, the amount of gas generated by the pyrotechnic material relative to the amount of pressurized gas and the expansion of the pressurized gas can be varied to a large extent by varying inflator parameters, such as the type and form of pyrotechnic material and the pressure of the gas, to meet the requirements of the intended application. In particular, the design variables for a particular inflator having a thermal efficiency of at least 95 percent include: the size, shape and thickness of the inflator housing, which is configured to reduce or eliminate the number of burning particles that contact the interior wall of the housing, and the material used to form the housing and the interior surface of the housing and the thermal conductivity of the material; and the amount and type of pyrotechnic material, the amount of particle compaction, and the amount of combustion product produced during combustion.

The high thermal efficiency inflator operates as follows: an ignitor, typically a pyrotechnic squib, initiates combustion of the pyrotechnic material within the inflator, which contains a stored, pressurized, chemically inert gas, releasing heat and gaseous combustion products into the stored gas, thereby increasing the pressure of the gas. The heat generated from the combustion of the pyrotechnic material is transferred directly and thermally, i.e., by molecular collisions, to the molecules of the gas in the housing without substantial contact with the housing or any other portion of the high thermal efficiency inflator other than the gas because the burning portions of the pyrotechnic material are substantially completely consumed before contacting the inner surface of the housing. The maximum pressure attained by the inert gas on combustion of the pyrotechnic material may be as high as about 60,000 psi, e.g., where the pyrotechnic material is confined within a holder or in the form of a solid extruded stick, such that the burning pyrotechnic material contacts only a portion of the gas in the housing. However, in the preferred embodiment described above, where the granules of pyrotechnic material are not confined after at least a portion of the container ruptures or burns, the maximum average pressure is typically on the order of 16,000 psi. However, if a different pressure is required for a specific application, the inflator may be adapted to provide the required pressure by varying the size of the housing, the amount or type of pyrotechnic material, the initial pressure of the stored pressurized gas, or a combination thereof in a manner that would be well understood by one of ordinary skill in the art, and such adaptations that are within the spirit and scope of the present invention. The seal is selected to open at a pressure higher than the initial pressure of the pressurized inert gas, but less than the maximum pressure attained during operation of the inflator. This allows for the continued heating of the gas within the inflator by burning pyrotechnic material as inflation gas is released from the high thermal efficiency inflator. At the outlet aperture, the pressure of the gas mixture from the inflator is reduced to approximately half, and the gas temperature is reduced approximately ten percent.

The housing, the holder, the end plug, and the manifold all present low thermal conductivity surfaces to the heated gas, thereby causing essentially all of the liberated heat from the combustion of the pyrotechnic combustion to be utilized effectively only to heat and expand the gas. Furthermore, another reason the holder and the housing do not absorb any significant amount of the generated heat is because they are relatively thin, on the order of from about 0.010 inch (about 0.25 mm) to about 0.020 inch (about 0.5 mm), and also because the inflator does not contain a filter that would absorb a significant amount of the thermal energy from the gas as the gas passes through the filter.

As discussed above, the pressurized gas in the housing is preferably an inert gas, such as argon, and is most preferably argon because of its low thermal conductivity. Moreover, the use of an inert gas substantially prevents any chemical reaction between the pyrotechnic material, or any byproducts or end products resulting from the combustion of such pyrotechnic material, and the gas. As a result, substantially all of the heat generated by the combustion of the pyrotechnic material is trapped within the molecules of the gas, raising the temperature of the gas, and increasing the pressure of the gas within the housing and against the seal. Because substantially all of the heat generated by the combustion of the pyrotechnic material is transferred to the gas, the inflator operates with a very high thermodynamic efficiency, allowing a minimum of pyrotechnic material to be used.

A still further reason that the housing and the holder do not absorb any significant amount of the generated heat is because they are exposed to high temperatures only for a relatively short period of time of approximately 10 ms or less. This is in contrast to existing inflators that function at such elevated temperatures for approximately 30 to 60 ms. During such relatively extended periods of time, heat is inevitably transferred to the members forming such inflators.

When the seal opens, the gas expands through the opening and the optional conduit. By eliminating the conduit, the heated inflation gas may be transferred directly through the opening to the object to be inflated. The area of the seal and the cross sectional areas of the opening and the conduit may be selected in a manner well known in the art to control the time for the opening of the seal and the flow of the gas through the opening and the conduit. The composition of the pyrotechnic material and the relative sizes of the different granules in such material also control the time within which the gas is heated within the holder. The composition accordingly controls the time for the gas to flow from the inflator.

To summarize, the superior performance of the high efficiency inflator is provided, at least in part, by the high thermal efficiency of the inflator. Factors that contribute to the high thermal efficiency include a propellant that completes combustion without contacting heat absorbing surfaces within the high efficiency inflator, substantially reducing parasitic heat loss to the walls of the pressure vessel, i.e., the housing of the high efficiency inflator. Preferably, the interior surface of the pressure vessel has a smooth, or, more preferably, has a mirrored inner surface to reflect heat radiation away from the interior surface, further reducing heat loss to the housing.

Typically, with a granular propellant, the flame spread and ignition transfer of the propellant can be controlled by, e.g., adjusting the packing density of the propellant, so that combustion of the propellant is substantially complete before any burning granules are propelled against the interior surface of the housing. By substantially eliminating contact of the interior surface of the housing by burning granules, heating of the housing is substantially eliminated. Instead, substantially all of the heat released by the combustion of the propellant directly heats the pressurized gas stored within the housing.

Preferably, the propellant granules are stored along the center line or central core of the high efficiency inflator at a distance from the interior surface of the housing sufficient to allow the complete combustion of the propellant, so that the combustion of the propellant granules occurs in the space between the central core, where the propellant granules are stored, and the interior surface of the housing without contacting the interior surface.

Upon ignition of the stored propellant within the central core, heat and gaseous combustion products are released, increasing the local pressure in the central core. This increase in pressure propels the propellant granules away from the central core, through the gas, and towards the interior surface of the housing.

The increased local pressure moves through the interior of the high efficiency inflator as an expanding gas front, exerting a force on each of the granules. Each granule responds to the force acting upon it by accelerating away from the increased pressure in the central core towards the interior wall at a rate determined by the mass of the particle, its effective cross sectional area, and the net force acting on the granule, i.e., the sum of all forces acting on the granule, which is approximately the difference in pressure on opposite sides of the granule. However, because the burn time of the propellant is sufficiently short, and the pressure of the gas is sufficiently high, combustion of the propellant is substantially complete before virtually any of the propellant granules moving through the gas are able to impact the interior wall of the housing. Therefore, substantially all of the heat produced from the combustion of the propellant is transferred to the gas, heating the gas with high efficiency.

In a typical inflator, the gas is stored at a pressure of at least about 4,000 psi, preferably from about 5,000 to about 8,000 psi, more preferably about 6,000 psi. Upon ignition of the propellant, heat and gaseous combustion products are released, increasing the pressure within the housing. At a pressure of about 7,000 to about 11,000, preferably from about 8,000 to about 10,000 psi, most preferably, about 9,000 psi, the seal opens, allowing gas to escape from the inflator. This occurs in less than about 1 ms, preferably, less than about 0.5 ms, a period of time significantly shorter than the burn time for all of the propellant granules to be ignited and burned. Therefore, even though gas begins to exit the inflator to inflate the inflatable object, the pressure continues to increase within the high efficiency inflator until substantially all of the propellant has completed burning. Upon completion of the combustion of the propellant, the pressure within the high efficiency inflator begins to decrease, and continues to decrease as the inflatable inflates.

In a typical high efficiency inflator, the granules of propellant have a size of about 20 mesh and a specific gravity of about 1.7. Because the pressure of the gas within the high efficiency inflator is so high, typically greater than about 4,000 psi initially, and, possibly, achieving average pressures greater than about 20,000 psi during the combustion process, the high pressure of the pressurized gas results in a very high drag upon each granule. As a result, the effective velocity achievement of each granule is only the order of 0.4 percent of what would be achieved without drag.

The increase in pressure at the core of the high efficiency inflator and the release of gaseous combustion products from the combustion of each granule causes the granules to fly through the pressurized gas. Although the average pressure within the high efficiency inflator may be on the order of 20,000 psi, the local pressure at the core of the high efficiency inflator may be on the order of about 50,000 psi, causing the granule to move form the center of the high efficiency inflator towards the interior wall of the housing. However, because combustion can occur on all sides of each granule, a granule typically does not necessarily fly in a straight line, but, instead, may follow an irregular path.

The final temperature and pressure of the gas within an inflatable object inflated with the inflator is controlled by the thermodynamics of the inflator apparatus, as well as the size of the inflatable object and the amounts of pressurized gas stored in the inflator. The factors, phenomena, and conditions which effect changes in temperature, pressure, and heat transfer are discussed below.

For the inflator to function in a collision, an impact detector is required in the self-contained air bag module of the invention to send a signal to an initiator, which, in turn, ignites the pyrotechnic material in the inflator, and ultimately results in the rapid flow of gases to the air bag. The impact detector is typically battery powered, and, preferably, provides a low voltage warning by a light or an audible signal. Since the electrical requirements to operate the module are small, modern longlife batteries should have a sufficient life expectancy that replacement is required only after at least five years. However, mechanical impact detectors that generate an electrical current as a result of the impact or initiate the functioning of the inflator by purely mechanical means, such as, e.g., a firing pin that impacts on a contact explosive, are known in the art, and are within the scope of the present invention. The impact detector should be resistant to vibration, and, in electronic impact detectors, have a full Faraday shield to prevent accidental activation of the detector and, thus, the air bag.

Figure 5:
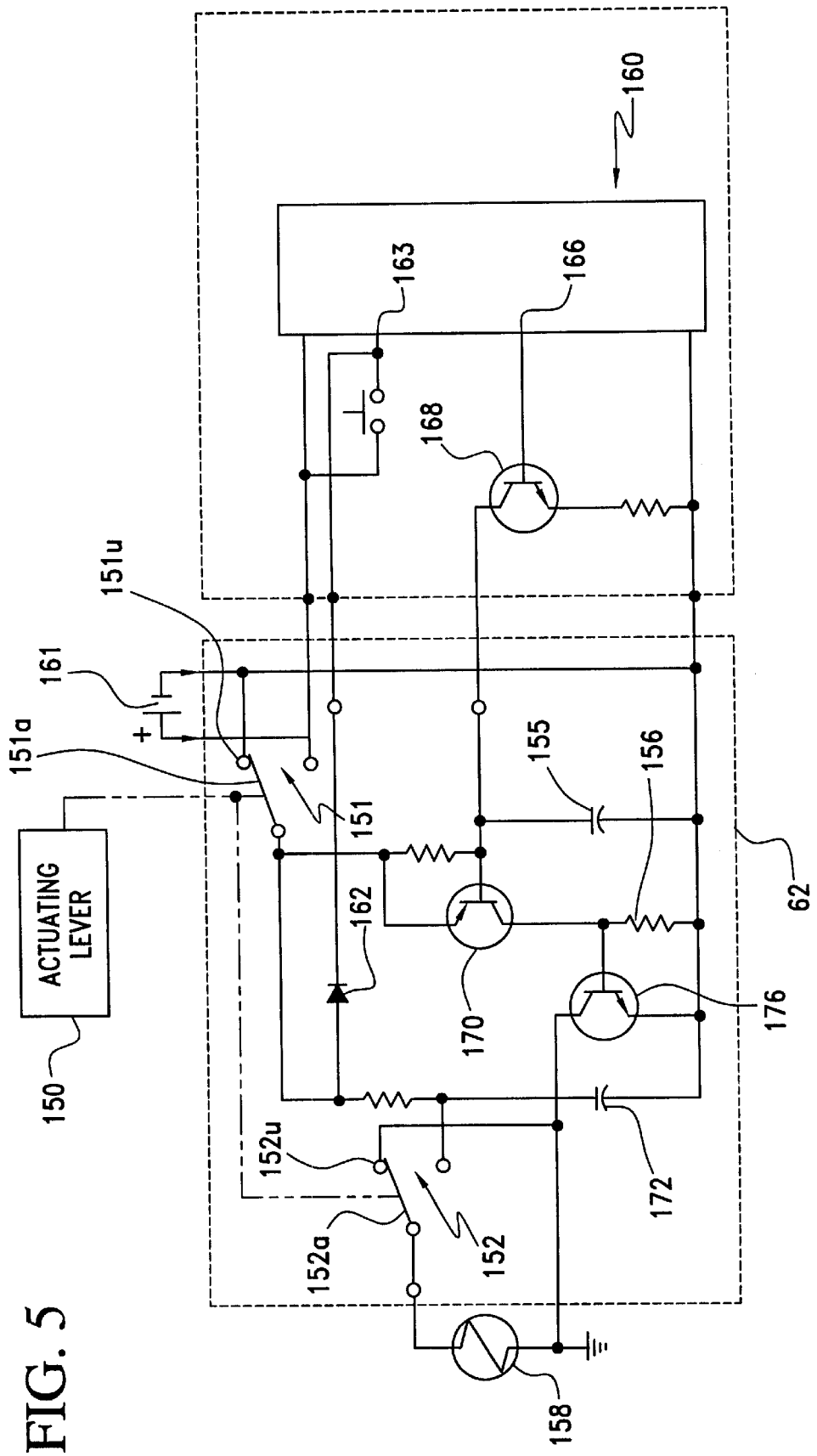
FIG. 5 is a schematic of impact detector circuitry useful in the invention.

Impact detectors and the electrical circuitry required to initiate an inflator are well known in the art. However, there is no prior art disclosure of the required detector, circuitry, inflator, and air bag being combined into a single module. U.S. Pat. No. 5,335,598, the teaching of which is incorporated herein by reference to the extent necessary to supplement this specification, discloses an electrical circuit for detecting an impact and initiating the function of the inflator that is useful with the present invention. The impact detector circuitry is shown in FIG. 5. An actuating lever 150 is moved upon impact, such that the movement of lever 150 moves switch arms 151a and 152a of switches 151 and 152, respectively. Prior to impact, switch arms 151a, 152a engage upper stationary contacts 151u and 152u of switches 151 and 152, which short circuits capacitor 155 and resistor 156. In addition, switch 152 also provides a short circuit across pyrotechnic squib 158. This prevents the charging of capacitor 155 and firing of squib 158. In this preimpact mode, timing circuit 160 is powered by battery 161.

Upon impact, actuating lever 150 moves switch arms 151a and 152a to their lower positions causing a voltage to be applied by battery 161 through diode 162 to start terminal 163 of timing circuit 160, and charging capacitor 155. After a preset time, timing circuit 160 produces a series of pulses on line 166, which trigger transistor 168 into a state of conductivity at the same frequency as the pulses. When transistor 168 is conductive, a relatively low voltage is produced on the collector of transistor 168. This low voltage discharges capacitor 155, and is introduced to the base of transistor 170 to make transistor 170 conductive. The pulses are filtered out by capacitor 155 as a result of the charging of the capacitor through a circuit including battery 161, switch 151, and the base/emitter junction of transistor 170.

The flow of current through transistor 170 causes a voltage to be produced across resistor 156, resulting in a state of conductivity in transistor 176. When transistor 176 becomes conductive, the impedance drops to a lower value, completing a circuit through capacitor 172, switch 152 in a second state of operation, pyrotechnic squib 158, and transistor 176. Capacitor 172 then discharges through initiator 158 to fire the initiator, and initiate operation of the inflator. Firing circuit 62 and initiator 158 are preferably housed in a single housing as disclosed in U.S. Pat. No. 5,499,579, the teaching of which is incorporated herein by reference to the extent necessary to supplement this specification.

Instead of a battery as the source of energy, circuit 160 may utilize an input mechanism, such as that disclosed in U.S. Pat. No. 5,507,230, the teaching of which is incorporated herein by reference to the extent necessary to supplement this specification. Such an input mechanism is capable of producing an input electrical pulse of, e.g., about 5 amperes for about 5 ms. The pulse from the input mechanism is rectified and converted to direct current, and is used to produce a signal that initiates the inflator.

The electronics for the detector are preferably shielded against extraneous radio and electrical noise that could potentially activate the initiator when the air bag was not required. Where electrical noise may trigger premature activation of the initiator, Faraday shielding may be placed around the firing circuit or internal filtering may be used or both. The triggering signal may be filtered by a low pass filter, e.g., inductance and capacitance, to prevent noise from passing through the circuit to initiate operation of the inflator when operation is not required. Finite filtering may also be employed, using, e.g., a zener diode, to limit the triggering signal amplitude. The filtered triggering signal charges the capacitance in the low pass filter, and the charge on the capacitor causes a second transistor to become conductive, thereby producing a voltage across an impedance. This voltage triggers the first transistor to the conductive state, providing the electrical signal that triggers the initiator. Faraday shielding and filtering are further described in U.S. Pat. No. 5,440,991, the teaching of which is incorporated herein by reference to the extent necessary to supplement this specification.

Figure 6:
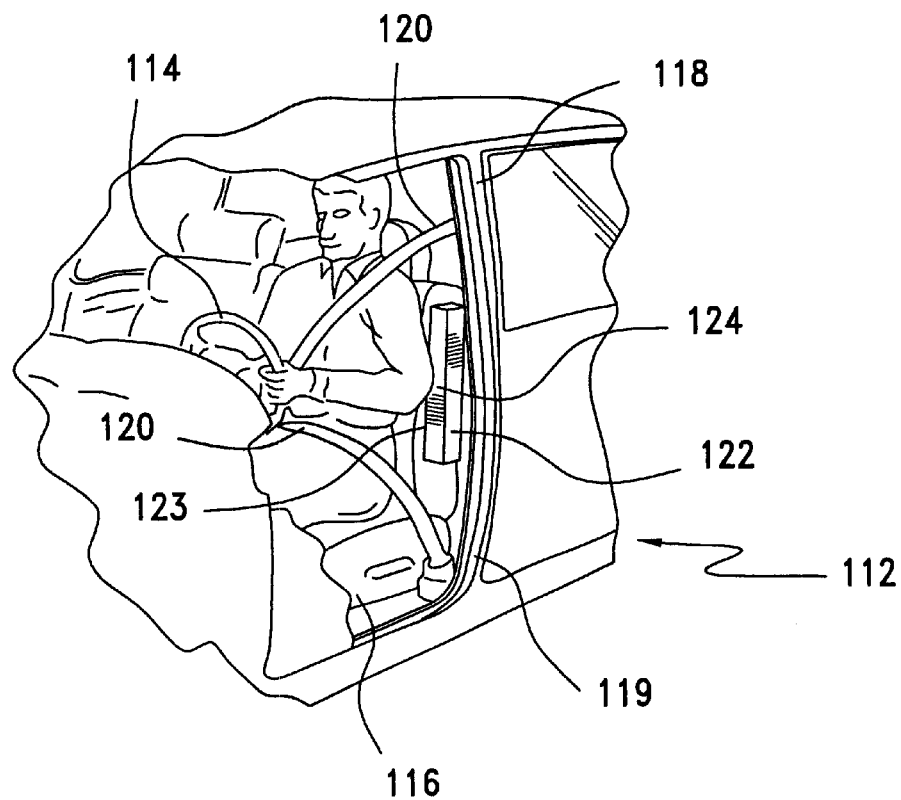
FIG. 6 shows the self-contained air bag module installed as a side bag.
Figure 7:
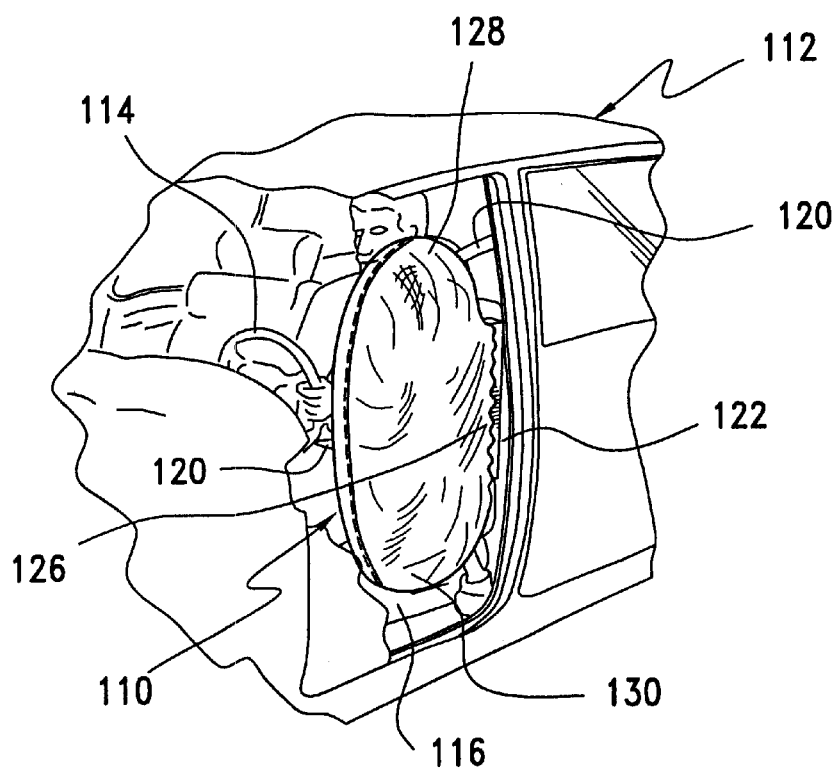
FIG. 7 shows the self-contained air bag module of FIG. 6 following deployment.

As noted above, the self-contained air bag module of the invention can be placed anywhere in a vehicle where protection for a passenger is required. As shown in FIGS. 6 and 7, the air bag module may be used as a side bag in a passenger car to provide protection in side impacts. However, as will be understood by one of skill in the art, the air bag module of the invention can be installed on seat backs to provide protection for rear seat passengers, under the dash to provide protection for the knees in a frontal crash, preventing the occupant from sliding or "submarining" under the dash in the event of a collision, and in headrests or seat backs to prevent whiplash injury in rear impacts. The self-contained air bag module of the invention can also be installed on airplanes, in passenger trains and in buses.

For use as a side bag, as shown in FIGS. 6 and 7, a compartment 122 containing an air bag 110 is securely attached to an interior portion of a vehicle 112 outboard of a passenger seat, such as, e.g., the A or B pillar of the vehicle, positioned, such that, when a collision involving the vehicle occurs, the air bag is inflated and expands to occupy the space between the occupant in the seat and the interior of the vehicle. However, as will be apparent to those skilled in the art, compartment 122 may be attached to the outboard side of seat 116. The vehicle includes a steering wheel 114 and a seat 116 to the rear of the steering wheel. A pillar 118 is provided at the rear of a framework for holding a door (not fully shown for purposes of clarity) for providing ingress to, and egress from vehicle 112. A seat belt 120 is typically worn such that the belt extends across the occupant's chest and across the occupant's lap to confine and secure the occupant within seat 116. Steering wheel 114, seat 116, pillar 118, framework 119 (not fully shown), and belt 120 are conventional in most motor vehicles.

Figure 10:
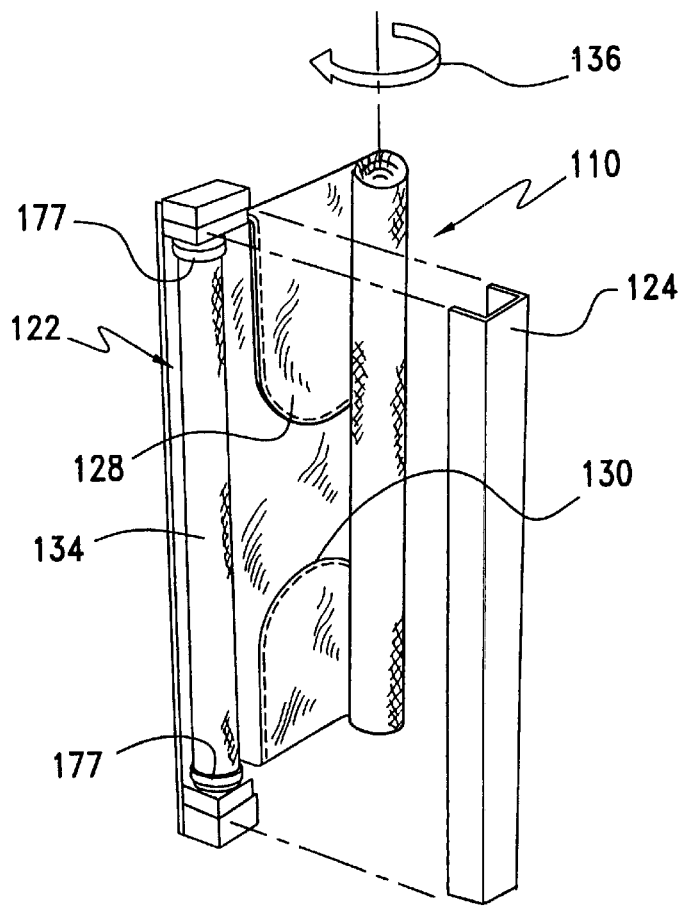
FIG. 10 illustrates the storage of an air bag in the module of the invention.
Figure 11:
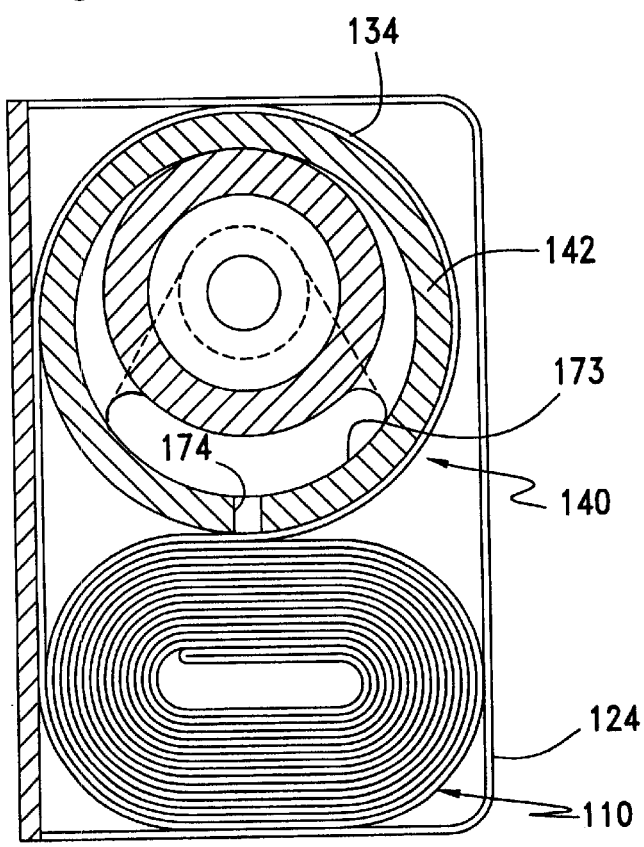
FIG. 11 is a cross sectional view of the module illustrated in FIG. 10.
Figures 12A, 12B:
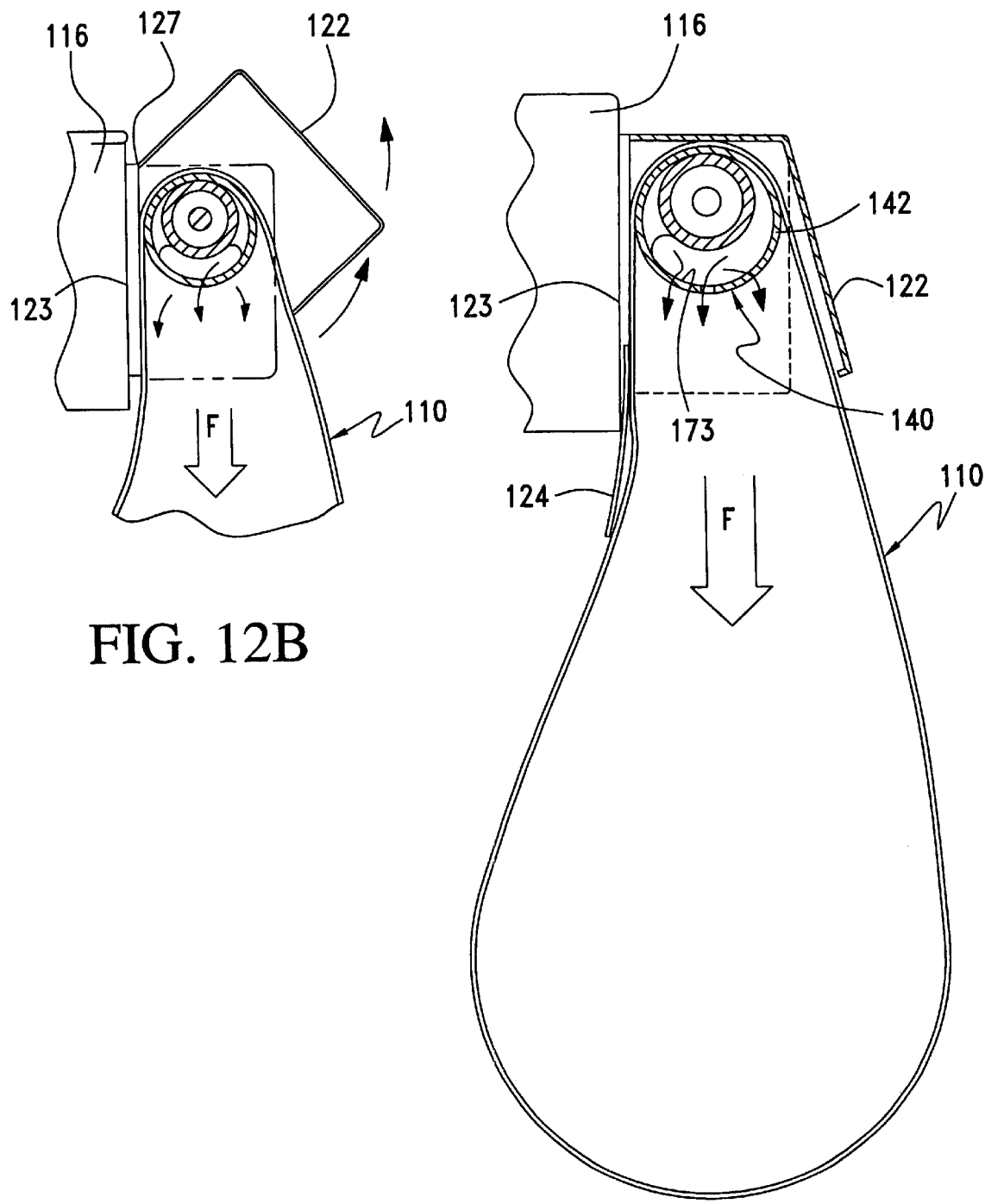
FIGS. 12a and 12b illustrate two alternative compartments for the module of FIG. 10.
Figure 13:
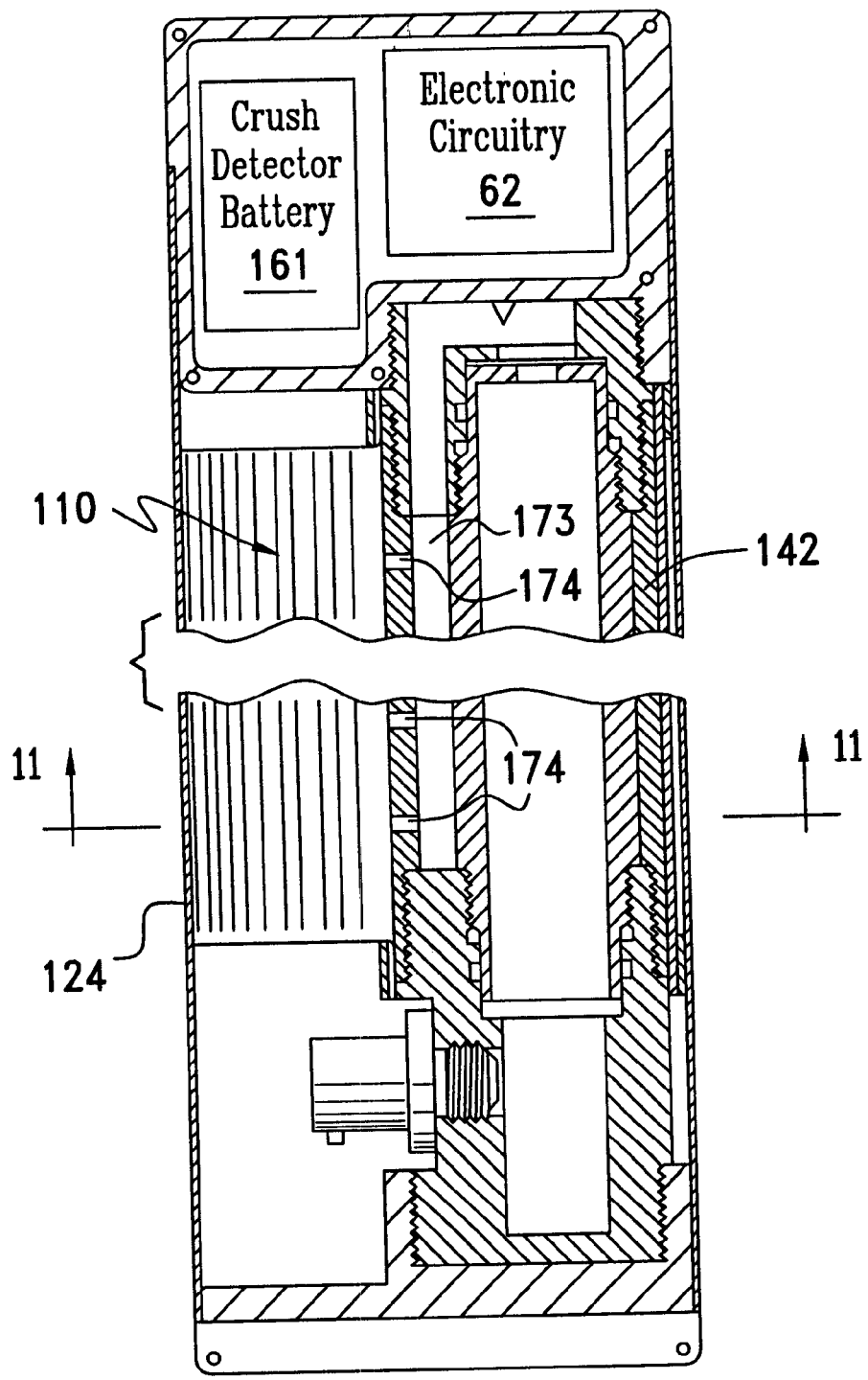
FIG. 13 illustrates an embodiment of the self-contained air bag module.
Figure 14:
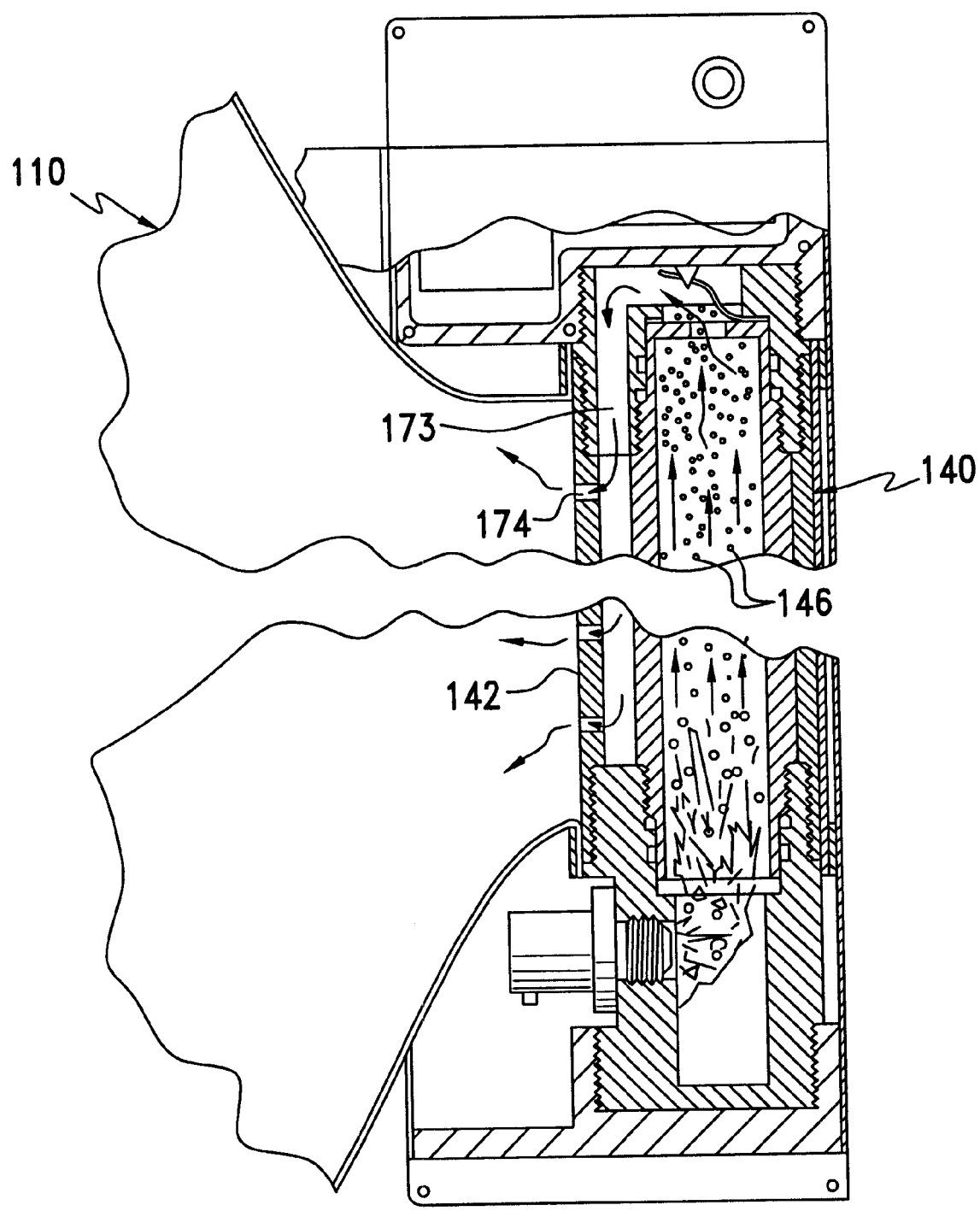
FIG. 14 illustrates the self-contained air bag module of FIG. 13 during inflation.

Compartment 122 is attached to the vehicle interior or, if desired, to the side of seat 116 in any manner known in the art, such as by an adhesive 123, which may be a suitable epoxy, or by mechanical means, such as screws or bolts. Compartment 122 is closed to store the air bag during normal operation of the vehicle, but, as shown in FIGS. 10, 11 and 12a, has a flap or door 124 that pivots open at the front of compartment 122 when the air bag inflates and deploys. Compartment 122 preferably has an exterior appearance that is aesthetically compatible with the interior of vehicle 112, and may be placed within the seat upholstery fabric in a manner that allows the air bag to deploy when needed.

The pivoting of flap 124 allows air bag 110 to expand from compartment 122 as the bag inflates. Alternatively, compartment 122 may be pivoted at the rear end 127, as shown in FIG. 12b, to allow expansion of bag 110 from the compartment as the air bag inflates. As will be apparent to those of ordinary skill in the art, compartment 122 may open in any manner that allows for the safe, rapid inflation of the air bag in addition to the manner shown in FIGS. 12a and 12b.

Although the figures described above illustrate the self-contained air bag module of the invention installed on the outboard side of the driver's seat, the module may also be placed adjacent to other seats in a vehicle in a similar manner to protect other passengers in the vehicle from side impacts.

As shown in FIGS. 8, 9a, 9b, and 10, inflatable bag 110 preferably has a body portion 126 and a pair of flaps 128 and 130, respectively, extending integrally in upward and downward directions from the body portion. Inflatable bag 110 is preferably formed from a single sheet of a suitable material having some elasticity, such as nylon, as shown in FIG. 9a. Where a single sheet of material is used to form the air bag, the sheet of material is preferably symmetrical about both a vertical axis 133 and a horizontal axis 135, but may have any shape required for a particular application. The single sheet of material is folded on the vertical axis, so that two layers are formed on top of each other, as shown in FIG. 9b, where each layer has the same configuration as the other. The two layers are then bonded together at their peripheries, using, e.g., stitches 132 or a glue or epoxy to produce bag 110.

Inflatable bag 110 typically has a root portion 134 that extends from the body portion 126 along the length of the body, and, as shown in FIGS. 11, 12a, 12b, 13, and 14, is in fluid communication at one end with an inflator 140 to allow gas from the inflator to flow into bag 110 during the inflation of the air bag. For use in the self-contained module of the invention, inflator 140 is in fluid communication with a manifold 142. Preferably, a passage 173 extends along substantially the full length of manifold 142, and holes 174 are provided in manifold 142 at spaced positions along the length of the manifold. Holes 174 provide a communication between passage 173 and inflatable bag 110. Preferably, the distance between successive pairs of holes 174 progressively decreases at progressive positions along the manifold. Bag 110 is clamped to manifold 142 at its opposite ends as by rings 177.

For storage, as shown in FIG. 8, upper flap 128 of air bag 110 is folded at a position corresponding substantially to the Lipper extremity of root portion 134 onto body portion 126 from the position shown in solid lines in FIG. 8, and, in a similar manner, lower flap 130 is folded at a position corresponding substantially to the lower extremity of root portion 134 onto body portion 126. Typically, flaps 128 and 130 do not overlap each other when folded on body portion 126. Air bag 110 is then spirally wound on its vertical axis into a tight roll as indicated by an arrow 136, as shown in FIG. 10. When the spiral winding of bag 110 has been completed, the bag is placed inside compartment 122, and flap 124 is pivoted to the closed position to hide the air bag from view, and to protect it when not in use.

When a collision of sufficient force to trigger the inflation of the air bag occurs, gas from the inflator causes air bag 110 to unwind from the tight spiral, forcing compartment flap 124 to open, as schematically shown in FIGS. 12a and 12b, allowing air bag 110 to inflate outside compartment 122. As air bag 110 fully unwinds, flaps 128 and 130 extended from their folded disposition on body portion 126 to positions that effectively increase the vertical height of air bag 110, enhancing the protection provided to the occupant of seat 116. Preferably, air bag 110 extends from a position relatively close to the vehicle floor, but not touching the vehicle floor, to a position adjacent the head of the occupant, as shown schematically in FIG. 7.

Figure 15:
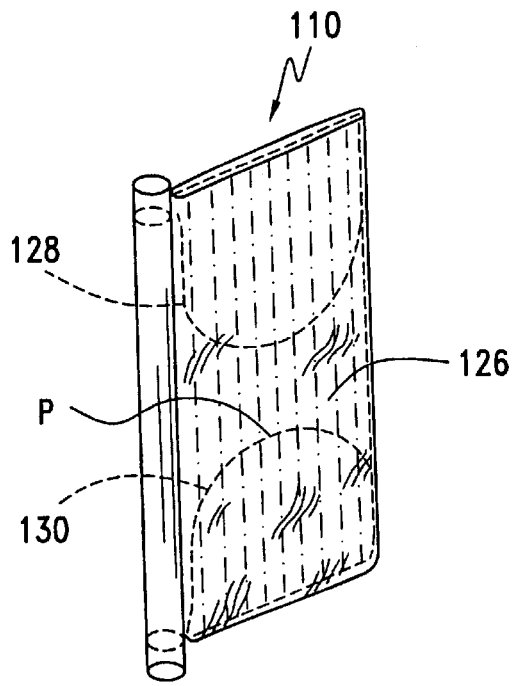
FIGS. 15 to 17 illustrate an alternative method of storing the air bag within the self-contained air bag module.
Figure 15A:
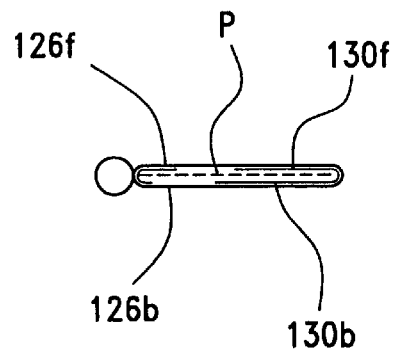

Alternatively, air bag 110 may be folded and deployed as shown in FIGS. 15, 15a, 16, and 17. Bag flaps 128 and 130 are inserted into air bag body 126, between bag body front and back sides, 126f and 126b. FIG. 15a is a bottom view of flap 130 having front and back sides 130f and 130b, respectively, tucked in between bag body walls 126f and 126b. As stowed, flap 130 forms a pocket having its uppermost point at P. The uppermost point P of flap 130 is shown in FIGS. 15 and 15a to further clarify that flap 130 is inside bag 110 prior to inflation.

Figure 17:
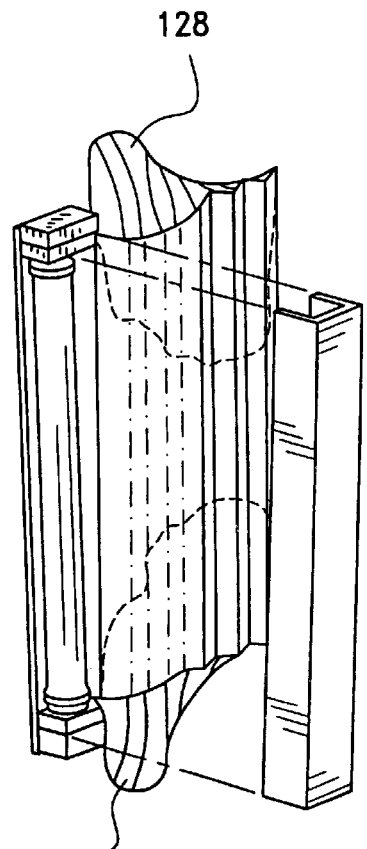
Figure 16:
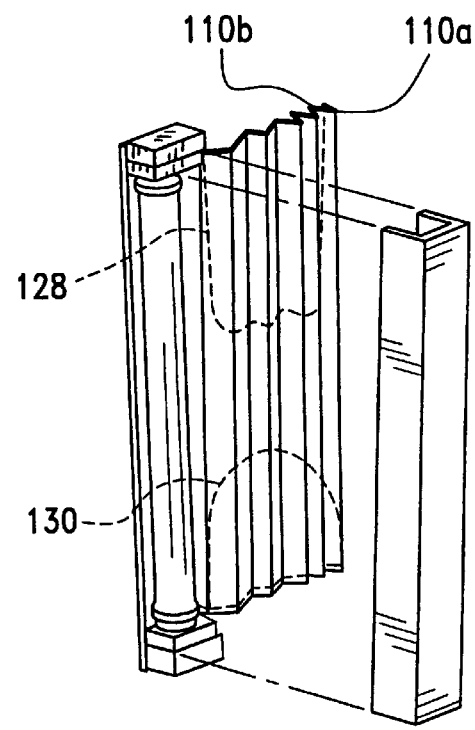

In this embodiment, as shown in FIGS. 16 and 17, air bag 110 is folded in a zigzag fashion by dividing bag 110 into vertical panel sections 110a, 110b, etc. By folding air bag 110 in this manner, the deployment during gas filling is facilitated, as flaps 128 and 130 emerge from the air bag body 126 during inflation of the air bag, as shown in FIG. 17, rather than after complete deployment of air bag 110, in contrast to a rolled bag with the flaps disposed outside the bag against the bag body sides, which does not release flaps 128 and 130 until the air bag is nearly completely unrolled, as shown in FIG. 10.

When positioned to provide protection in a side impact, as illustrated in FIGS. 6 and 7, the inflated air bag 110 occupies the space between the outboard side of the occupant's seat and framework 119, protecting the occupant from a collision involving the side of vehicle 112. This is especially important because essentially only the thin sheet of metallic or plastic material forming the shell of the vehicle protects the occupant from the forces imposed upon the occupant as a result of such a collision.

During inflation, air bag 110 unfolds, as shown in FIGS. 16 and 17, or unwinds from the spiral configuration, shown in FIGS. 10, 12a, and 12b, in a direction along the length of vehicle 112. When air bag 110 has become unwound fully, the longitudinal dimension is significantly larger than that shown in FIG. 10, so that air beg 110 extends across the full length of the occupant in the seated disposition, protecting the occupants body from the impact, as shown in FIG. 7.

Bag 110 may be inflated uniformly along the full length of bag 110 by spacing successive holes 174 progressively closer to one another along the full length of bag 110. This compensates for the decrease in the pressure of the gas in passage 173 at progressive positions along bag 110 because of the flow of the gas through such holes at the progressive positions.

When bag 110 has become fully unwound from its spiral configuration, flaps 128 and 130 in the bag become lifted from body portion 126. This provides for an extension of bag 110 in the vertical direction. In this way, bag 110 becomes extended vertically. For a typical air bag designed for side protection, the height of bag 110 in compartment 122 is about sixteen inches. After bag 110 has become fully inflated, the height of the bag is about twenty six inches because of the rotation of flaps 128 and 130 from body portion 126. This height is sufficient to protect the seated occupant from the occupant's hips to the occupant's head.

The inflation of air bag 110 controls the motion of the occupant's head by providing an inflated cushion that supports the occupant's head and prevents it from rotating violently to the side in a side impact. Typically, where no support is provided, the occupant's head and torso move violently to the side of the vehicle, causing the occupant's head to strike against the window, door, or shell of vehicle 112. As a result, where only standard seat belts are used, severe head and neck injuries can occur. In addition to preventing or reducing such injuries, protection is also provided for the occupant's torso and hips.

The time required for the inflation of air bag 110 following an impact is substantially shorter than required for prior art air bags. This results, in part, from the rapid inflation provided by the preferred inflator, i.e., no more than about two to five milliseconds. In addition, only about ten to fifteen milliseconds are required for the gas to flow through passage 173 into air bag 110. Therefore, the total time required for the inflation of air bag 110 is sufficiently short to provide the protection required in a side impact.

In addition, the amount of pyrotechnic material 14 in holder 15, as shown in FIG. 1, is so small, and the thermodynamics of the inflator are such that the increase in temperature of the inflatable restraint during inflation is minimal, typically no more than about 50 to 120 F., which reduces or eliminates the risk of burns to the occupant and the air bag, as sometimes occurs with prior art air bags.

As discussed above, a major advantage of the air bag module of the invention is its ability to be retrofitted in a vehicle without requiring any major modification of the vehicle. An air bag can be installed to provided protection in frontal, side, and rear impacts for an occupant of any seat in a vehicle, including those in cars, buses, airplanes, and trains. An air bag can be provided as an integral assembly for each of these seats by installing the self-contained module on the side or rear of a seat or on an interior portion of the vehicle.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments that fall within the true spirit and scope of the present invention.

I claim:

1. A self-contained air bag module, comprising:

an air bag having an interior volume in fluid communication with a high thermal efficiency inflator, the high thermal efficiency inflator having an initiator, and adapted for producing a sufficient quantity of a gaseous product to substantially inflate the air bag; and an impact detector in electrical or mechanical communication with the initiator; wherein the high thermal efficiency inflator comprises:

a housing having an inner surface, and defining an interior volume, the housing containing a pressurized gas at a first pressure in the interior volume;

a pyrotechnic material for producing heat upon combustion, having a burn rate that is accelerated at the first pressure in comparison to the burn rate at a pressure of one atmosphere, the pyrotechnic material stored within the interior volume of the housing at a distance from the inner surface of the housing, wherein the stored pyrotechnic material is subjected to the first pressure of the pressurized gas, wherein the pyrotechnic material in and of itself is substantially free of thermal contact with the housing before the combustion thereof;

an ignitor for initiating combustion of the pyrotechnic material upon receipt of an initiation signal; and means for maintaining the pressurized gas at the first pressure within the interior volume, and to open when the gas attains a predetermined second, higher pressure upon heating of the pressurized gas by combustion of the pyrotechnic material to allow an inflation gas to pass from the housing; wherein the pyrotechnic material is present in an amount sufficient to produce at least about 10 mole percent of the inflation gas, and the pressurized gas is present in an amount sufficient to produce up to about 90 mole percent of the inflation gas; and wherein the first pressure of the gas is sufficiently high to produce an aerodynamic drag on burning pyrotechnic material passing through the gas, thereby slowing the burning pyrotechnic material; wherein the drag produced on the burning pyrotechnic material and the distance between the stored pyrotechnic material and the inner surface of the housing are sufficiently great that, upon combustion of the pyrotechnic material, contact between a sufficient amount of the burning pyrotechnic material and the inner surface of the housing is prevented to allow at least about 90 percent of the heat produced by the combustion of the pyrotechnic material to be transferred to the inflation gas, so that no more than about 10 percent of the heat is transferred to the housing, resulting in a thermal efficiency of the high thermal efficiency inflator of at least about 90 percent.

2. The self-contained air bag module of claim 1, wherein the pyrotechnic material is located within the housing in a frangible container that ruptures upon combustion of the pyrotechnic material.

3. The self-contained air bag module of claim 1, wherein the pyrotechnic material is located within the housing in a container formed from a combustible material that burns upon combustion of the pyrotechnic material.

4. The self-contained air bag module of claim 3, wherein the combustible material is deep draw steel, aluminum or a combination of palladium and aluminum.

5. The self-contained air bag module of claim 1, wherein the pyrotechnic material is located within the housing in a container comprising a plug formed from a frangible or combustible material, such that, upon combustion of the pyrotechnic material, the plug ruptures or burns, allowing particles of burning pyrotechnic material to pass through the pressurized gas, transferring heat to the pressurized gas.

6. The self-contained air bag module of claim 5, wherein the container defines a plurality of apertures or pores.

7. The self-contained air bag module of claim 1, wherein the pyrotechnic material is located within the housing in a porous container defining a plurality of apertures or pores, wherein the apertures or pores are of a sufficient size and a sufficient number to allow combusting particles to pass into the interior volume from the porous container through the pores, thereby heating the pressurized gas.

8. The self-contained air bag module of claim 1, wherein the pyrotechnic material is stored within the housing in the form of an extruded stick of the material.

9. The self-contained air bag module of claim 1, wherein the distance between the stored pyrotechnic material and the inner surface of the housing is at least about 0.25 inch.

10. The self-contained air bag module of claim 9, wherein the distance between the stored pyrotechnic material and the inner surface of the housing is at least about 0.5 inch.

11. The self-contained air bag module of claim 1, wherein the first pressure is at least about 4,000 psi.

12. The self-contained air bag module of claim 11, wherein the first pressure is from about 5,000 to about 7,000 psi.

13. The self-contained air bag module of claim 12, wherein the first pressure is about 6,000 psi.

14. The self-contained air bag module of claim 1, wherein the first pressure is sufficiently high and the pyrotechnic material is present in an amount sufficient to produce a peak operational pressure in the inflation gas of from about 12,000 psi to about 20,000 psi.

15. The self-contained air bag module of claim 14, wherein the peak operational pressure of the inflation gas is from about 15,000 psi to about 17,000 psi.

16. The self-contained air bag module of claim 15, wherein the peak operational pressure of the inflation gas is about 16,000 psi.

17. The self-contained air bag module of claim 1, wherein the second pressure is from about 7,000 to about 11,000 psi.

18. The self-contained air bag module of claim 1, wherein the second pressure ranges from about 8,000 to about 10,000 psi.

19. The self-contained air bag module of claim 1, wherein the pyrotechnic material is present in an amount sufficient to produce from about 40 to about 60 mole percent of the inflation gas.

20. The self-contained air bag module of claim 1, wherein the pyrotechnic material is a microporous, solvent processed propellant.

21. The self-contained air bag module of claim 20, wherein the pyrotechnic material has a porosity of at least about 20 percent.

22. The self-contained air bag module of claim 20, wherein the pyrotechnic material comprises ammonium nitrate oxidizer and an energizer.

23. The self-contained air bag module of claim 22, wherein the energizer comprises at least one of RDX, HMX, CL-20, TNX, NQ, NTO, TAGN, PETN, TATB, and TNAZ.

24. The self-contained air bag module of claim 22, wherein the pyrotechnic material comprises ammonium nitrate, RDX, and a cellulose acetate binder.

25. The self-contained air bag module of claim 24, wherein the pyrotechnic material comprises about 60 weight percent ammonium nitrate, about 36 weight percent RDX, and about 4 weight percent cellulose acetate binder, and has a burn rate of 20,000 m/s.

26. The self-contained air bag module of claim 20, wherein the pyrotechnic material is in the form of an extruded stick, a fine powder, flakes, granules, or particles.

27. The self-contained air bag module of claim 1, wherein the ignitor is a pyrotechnic squib.

28. The self-contained air bag module of claim 27, wherein the pyrotechnic squib comprises a pair of connector pins electrically connected by a bridge wire, coated with or in thermal contact with a first firing compound, wherein the first firing compound is subjected to the pressure of the pressurized gas.

29. The self-contained air bag module of claim 1, wherein the pressurized gas is a chemically inert gas having a thermal conductivity of no more than about 250 W/cm·° C. at 25° C.

30. The self-contained air bag module of claim 29, wherein the pressurized gas is argon, or a mixture containing argon.

31. The self-contained air bag module of claim 1, wherein the housing is formed from a material having a thermal conductivity at 25° C. of less than about 1 Watts/cm·° C.

32. The self-contained air bag module of claim 31, wherein at least a portion of the housing is formed from at least one material selected from the group consisting of low thermal conductivity metal, ceramic, epoxy, fiber glass, and nylon.

33. The self-contained air bag module of claim 1, wherein the impact detector comprises an actuating arm configured and adapted to move at least one switch arm upon impact, thereby initiating a timing circuit and charging a capacitor with current from a battery, such that when the charged capacitor is discharged after a preset period of time, operation of the inflator is initiated.

34. The self-contained air bag module of claim 1, further comprising a compartment containing the air bag, wherein the compartment is configured and adapted for attachment to an interior portion of a vehicle to provide protection for an occupant of the vehicle.

35. The self-contained air bag module of claim 34, wherein the compartment comprises at least one flap or door that pivots open to allow inflation of the air bag.

36. The self-contained air bag module of claim 34, wherein the air bag comprises a body portion having an interior volume, a first end, a second end, and a length, a first flap attached to the first end, and having an interior volume in fluid communication with the interior volume of the body portion, a second flap attached to the second end, and having an interior volume in fluid communication with the interior volume of the body portion, and a root portion, extending along the length of the body portion, in fluid communication with the interior volume of the body portion and the inflator; wherein, for storage in the compartment, the first flap and the second flap are folded across the body portion, and the air bag is spirally wound in a tight roll that unwinds during inflation.

37. A method of protecting an occupant of a vehicle in a collision involving the vehicle, the method comprising: providing a self-contained air bag module, comprising:

- an air bag in fluid communication with a high thermal efficiency inflator, having an initiator, and adapted for producing a sufficient quantity of a gaseous product to substantially inflate the air bag, wherein the inflator is in fluid communication with the air bag; and
- an impact detector in electrical or mechanical communication with the initiator; wherein the high thermal efficiency inflator comprises:
  - a housing having an inner surface, and defining an interior volume, the housing containing a pressurized gas at a first pressure in the interior volume;
  - a pyrotechnic material for producing heat upon combustion, having a burn rate that is accelerated at the first pressure in comparison to the burn rate at a pressure of one atmosphere, the pyrotechnic material stored within the interior volume of the housing at a distance from the inner surface of the housing, wherein the stored pyrotechnic material is subjected to the first pressure of the pressurized gas, wherein the pyrotechnic material in and of itself is substantially free of thermal contact with the housing before the combustion thereof;
  - an ignitor for initiating combustion of—the pyrotechnic material upon receipt of an initiation signal; and
  - means for maintaining the pressurized gas at the first pressure within the interior volume, and to open when the gas attains a predetermined second, higher pressure upon heating of the pressurized gas by combustion of the pyrotechnic material to allow an inflation gas to pass from the housing; wherein
  the pyrotechnic material is present in an amount sufficient to produce at least about 10 mole percent of the inflation gas, and the pressurized gas is present in an amount sufficient to produce up to about 90 mole percent of the inflation gas; and wherein
  the first pressure of the gas is sufficiently high to produce an aerodynamic drag on burning pyrotechnic material passing through the gas, thereby slowing the burning pyrotechnic material; wherein
    the drag produced on the burning pyrotechnic material and the distance between the stored pyrotechnic material and the inner surface of the housing are sufficiently great that, upon combustion of the pyrotechnic material, contact between a sufficient amount of the burning pyrotechnic material and the inner surface of the housing is prevented to allow at least about 90 percent of the heat produced by the combustion of the pyrotechnic material to be transferred to the inflation gas, so that no more than about 10 percent of the heat is transferred to the housing, resulting in a thermal efficiency of the high thermal efficiency inflator of at least about 90 percent; and
  detecting the collision with the impact detector, thereby initiating operation of the inflator, and inflating the air bag to protect the occupant.

38. The method of claim 37, further comprising initiating operation of the inflator by moving at least one switch arm with an actuating lever that moves upon impact of the vehicle; thereby causing a voltage to be applied by a source of electrical power through a diode to a timing circuit start terminal, and charging a capacitor; producing a series of pulses with the timing circuit after a preset time, triggering a transistor having a collector into a state of conductivity at the same frequency as the pulses, producing a voltage on the collector of the transistor; and using the voltage to discharge the capacitor through the ignitor to fire the ignitor, and initiate operation of the inflator.

39. The method of claim 37, further comprising providing the pressurized gas at a first pressure sufficiently high to produce an aerodynamic drag on burning pyrotechnic material passing through the gas, thereby slowing the burning pyrotechnic material, such that the drag produced on the burning pyrotechnic material and the distance between the stored pyrotechnic material's location and the inner surface of the housing prevent contact between at least 50 percent of the burning pyrotechnic material and the housing.

* * * * *